US009287591B2

(12) United States Patent
Suzuki

(10) Patent No.: US 9,287,591 B2
(45) Date of Patent: Mar. 15, 2016

(54) BATTERY PACK WITH PROTECTIVE CIRCUIT BOARD AND ELECTRIC BICYCLE INCLUDING THE BATTERY PACK

(75) Inventor: Toru Suzuki, Sagamihara (JP)

(73) Assignee: NEC Energy Devices, Ltd., Tokyo (JP)

( * ) Notice: Subject to any disclaimer, the term of this patent is extended or adjusted under 35 U.S.C. 154(b) by 154 days.

(21) Appl. No.: 14/008,465

(22) PCT Filed: Sep. 7, 2011

(86) PCT No.: PCT/JP2011/005030
§ 371 (c)(1),
(2), (4) Date: Sep. 27, 2013

(87) PCT Pub. No.: WO2012/131800
PCT Pub. Date: Oct. 4, 2012

(65) Prior Publication Data
US 2014/0017521 A1    Jan. 16, 2014

(30) Foreign Application Priority Data

Mar. 31, 2011  (JP) .................................. 2011-078306

(51) Int. Cl.
*H01M 10/42*  (2006.01)
*H01M 2/10*   (2006.01)
*H01M 2/02*   (2006.01)
*H01M 2/20*   (2006.01)

(52) U.S. Cl.
CPC .......... *H01M 10/425* (2013.01); *H01M 2/1077* (2013.01); *H01M 2/1094* (2013.01); *H01M 2/021* (2013.01); *H01M 2/0212* (2013.01); *H01M 2/206* (2013.01)

(58) Field of Classification Search
None
See application file for complete search history.

(56) References Cited

U.S. PATENT DOCUMENTS

| 5,379,186 | A |   | 1/1995  | Gold et al. |
|-----------|---|---|---------|-------------|
| 5,897,913 | A | * | 4/1999  | Dessaux ................ H05K 3/284 427/426 |
| 6,127,038 | A |   | 10/2000 | McCullough et al. |
| 7,301,303 | B1|   | 11/2007 | Hulden |

(Continued)

FOREIGN PATENT DOCUMENTS

| CN | 1989633 A | 6/2007 |
|----|-----------|--------|
| CN | 100444430 | 12/2008 |

(Continued)

OTHER PUBLICATIONS

Machine English Translation of JP2011-034775A.*

(Continued)

*Primary Examiner* — Patrick Ryan
*Assistant Examiner* — Lucas J O Donnell
(74) *Attorney, Agent, or Firm* — Foley & Lardner LLP

(57) ABSTRACT

To provide a battery pack that is less likely to be affected by vibrations, shocks and the like and has a stable characteristic, and an electric bicycle that uses the battery pack.
A battery pack includes: a battery protective member having a first plate section and a second plate section which is integrally connected to both edge portions of a width direction of the first plate section and extends substantially in a direction perpendicular to both surfaces of the first plate section, wherein the flat batteries are placed on the first plate section; and a protective circuit board. A moistureproof film for the protective circuit board is formed using a plurality of film forming materials different in viscosity, hardness, and thixotropic properties.

6 Claims, 24 Drawing Sheets

(56) References Cited

U.S. PATENT DOCUMENTS

| | | |
|---|---|---|
| 2002/0029900 A1 | 3/2002 | Wimberger et al. |
| 2004/0050414 A1 | 3/2004 | Oogami |
| 2005/0007068 A1 | 1/2005 | Johnson et al. |
| 2005/0202315 A1 | 9/2005 | Sugeno et al. |
| 2005/0260488 A1 | 11/2005 | Zhou et al. |
| 2006/0096778 A1 | 5/2006 | Yun |
| 2006/0216600 A1 | 9/2006 | Inagaki et al. |
| 2007/0287063 A1 | 12/2007 | Hiratsuka et al. |
| 2007/0289129 A1 * | 12/2007 | Wing et al. .................. 29/855 |
| 2009/0087727 A1 | 4/2009 | Harada et al. |
| 2009/0297936 A1 | 12/2009 | Nemoto et al. |
| 2010/0102461 A1 | 4/2010 | Miyagawa et al. |
| 2011/0059347 A1 | 3/2011 | Lee et al. |

FOREIGN PATENT DOCUMENTS

| | | |
|---|---|---|
| CN | 101521294 A | 9/2009 |
| DE | 10 2009 008 222 A1 | 8/2010 |
| EP | 2 031 672 A1 | 3/2009 |
| JP | 61-70366 U | 5/1986 |
| JP | 63-179652 U | 11/1988 |
| JP | 04-091443 A | 3/1992 |
| JP | 05-090957 U | 12/1993 |
| JP | 11-204571 A | 7/1999 |
| JP | 11-251343 A | 9/1999 |
| JP | 2000-021379 A | 1/2000 |
| JP | 2002-124226 | 4/2002 |
| JP | 2003-297303 | 10/2003 |
| JP | 2004-079219 A | 3/2004 |
| JP | 2004-327311 | 11/2004 |
| JP | 2005-209368 A | 8/2005 |
| JP | 2006-196277 A | 7/2006 |
| JP | 2007-087909 A | 4/2007 |
| JP | 2007-257901 | 10/2007 |
| JP | 2007-257901 A | 10/2007 |
| JP | 2008-047371 A | 2/2008 |
| JP | 2008-147047 A | 6/2008 |
| JP | 2008-235170 | 10/2008 |
| JP | 2009-163932 A | 7/2009 |
| JP | 2009-224227 | 10/2009 |
| JP | 2009-252553 | 10/2009 |
| JP | 2011034775 A * | 2/2011 |
| WO | WO-2008/007767 A1 | 1/2008 |
| WO | WO2011/013767 A1 | 2/2011 |
| WO | WO-2011/027817 A1 | 3/2011 |

OTHER PUBLICATIONS

Extended European Search Report mailed Nov. 3, 2014 in related European application No. 11862185.3 (7 pgs.).
Office Action mailed Nov. 5, 2014 in related Japanese application No. 2011-078306 with partial English-language translation (7 pgs.).
Office Action mailed Nov. 5, 2014 in related Japanese application No. 2011-078304 with partial English-language translation (4 pgs.).
International Search Report for PCT/JP2011/005028 dated Dec. 12, 2011.
International Search Report in PCT/JP2011/005029, dated Dec. 20, 2011.
Office Action mailed Nov. 19, 2014 in related Japanese application No. 2011-078302 with partial English-language translation (5 pgs.).
Office Action mailed Dec. 18, 2015 in related Japanese application No. 2011-078297 with partial English-language translation (8 pgs.).
Office Action mailed Feb. 11, 2014 in related Chinese application No. 201110297192.3 with English-language translation (18 pgs.).
Extended European Search Report mailed Aug. 6, 2014 in related European application No. 11862652.2 (5 pgs.).
Extended European Search Report mailed Aug. 6, 2014 in related European application No. 11862604.3 (5 pgs.).
International Search Report received in PCT/JP2011/005030 dated Dec. 6, 2011.
Office Action mailed Nov. 7, 2014 in related Japanese application No. 2011-078305 with partial English-language translation (5 pgs.).
Office Action mailed Dec. 19, 2014 in related Japanese application No. 2011-078303 with partial English-language translation (7 pgs.).
Office Action mailed Apr. 30, 2015 in related Chinese Application No. 201180069815 with English-language translation (18 pgs.).
Non-final Office Action mailed May 27, 2015 in co-pending U.S. Appl. No. 14/008,040 (12 pgs.).
Office Action mailed Apr. 3, 2015 in related Chinese Application No. 201180069814.5 with English-language translation (26 pgs.).
Examination Report mailed Mar. 24, 2015 in related European Application No. 11862652.2 (3 pgs.).

* cited by examiner

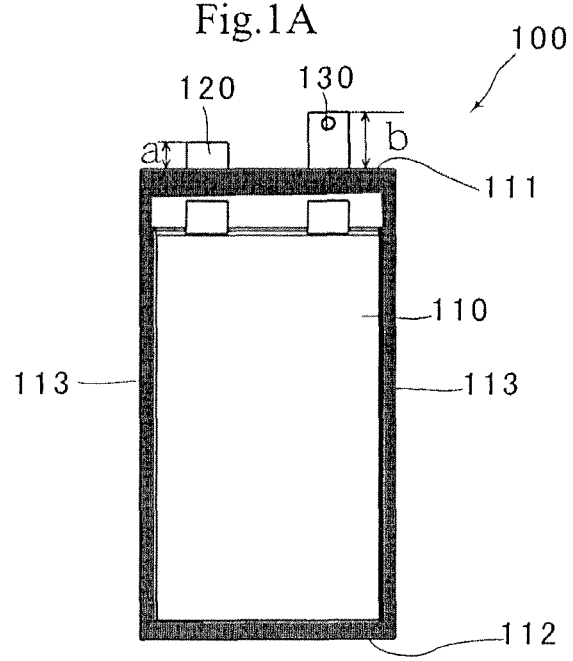
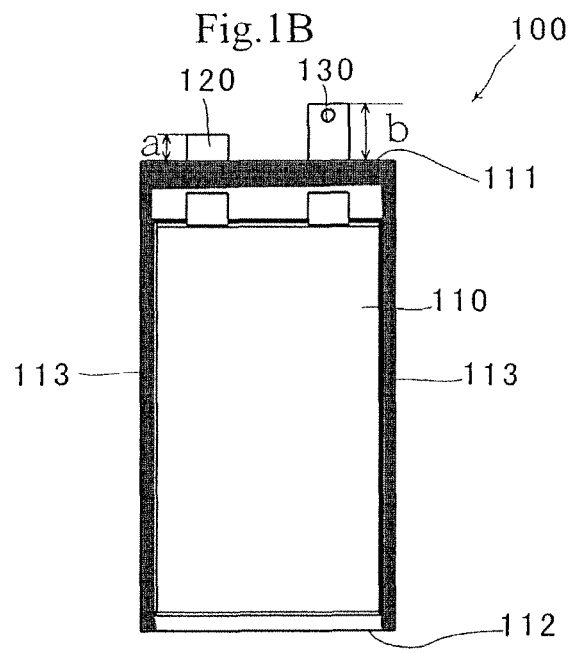

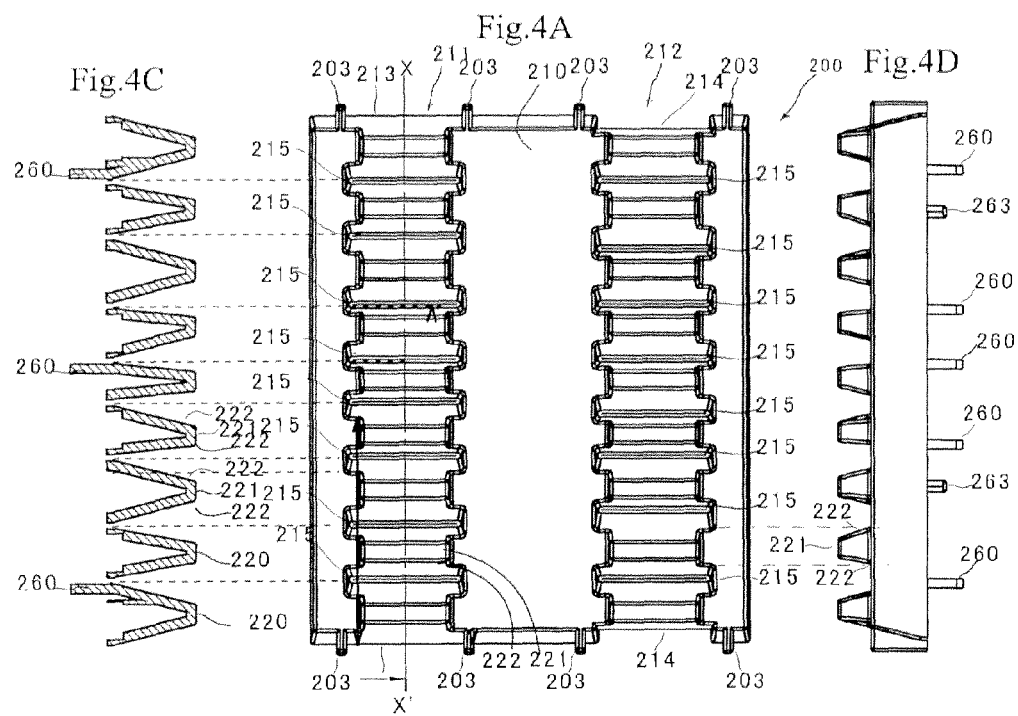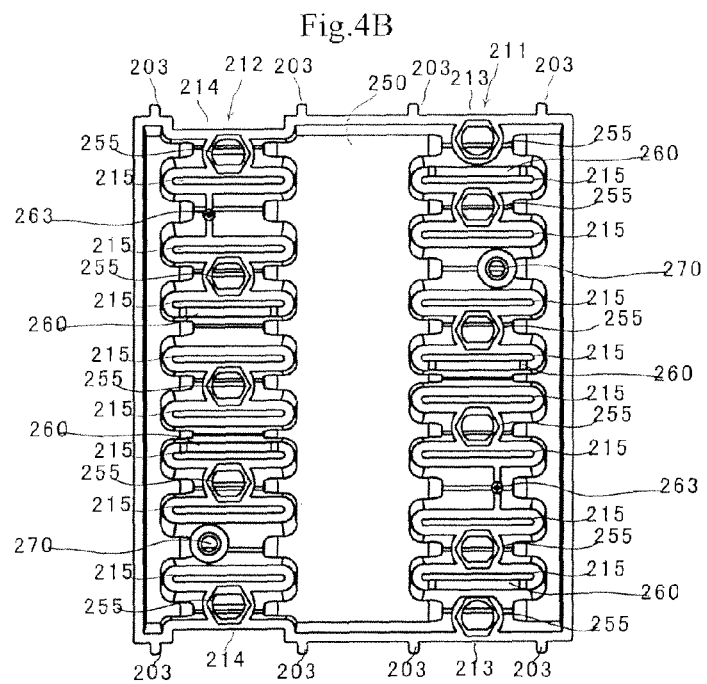

BATTERY PACK WITH PROTECTIVE CIRCUIT BOARD AND ELECTRIC BICYCLE INCLUDING THE BATTERY PACK

This application is the National Phase of PCT/JP2011/005030, filed Sep. 7, 2011, which claims priority to Japanese Application No. 2011-078306, filed Mar. 31, 2011, the disclosures of which are hereby incorporated by reference in their entirety.

BACKGROUND OF THE INVENTION

1. Field of the Invention

The present invention relates to a battery pack, which is formed by connecting a plurality of secondary batteries, and an electric bicycle in which the battery pack is installed.

2. Description of Related Art

In electric bicycles, various kinds of secondary batteries are used as power sources for drive or auxiliary drive. Among the above secondary batteries, a lithium ion secondary battery, in which charge and discharge take place as lithium ions move between positive and negative electrodes, is preferably used as a battery for a drive power source because the lithium ion secondary battery has the following battery characteristics: high energy density and high output power.

The following lithium ion batteries are known: a lithium ion battery that is in the shape of a cylinder around which positive and negative electrodes are stacked and wound via separators; and a flat lithium ion battery in which positive and negative electrodes are stacked via separators.

Among the above lithium ion batteries, the flat lithium ion battery is preferably used as a battery for a power source of a device driving motor or the like because it is easy to increase capacity per unit battery by increasing the number of positive and negative electrodes stacked or by increasing the areas of positive and negative electrodes.

As for a unit battery of the flat lithium ion battery, it is possible to make effective use of the high energy density that the lithium ion battery has by covering battery elements with a film casing material.

The film-covered battery is used in various ways. For example, what is proposed in Patent Document 1 (JP-A-2007-257901) is a battery pack for an electric bicycle that uses a film-covered battery.

SUMMARY OF THE INVENTION

The following electric bicycles are known: an electric bicycle that is designed to reduce burden on a rider when the bicycle is running with the help of an operation of an attached motor; and an electric bicycle that can be self-propelled even when a rider is not pedaling. A motor, a driving device, and a motor-driving battery add to the mass of an electric bicycle. Therefore, such devices are required to be smaller in mass. The electric bicycles require a large-capacity battery when running a long distance or for a long time in order to make use of an operation of a motor.

Among the various kinds of batteries, a lithium ion battery that is large in gravimetric energy density and volumetric energy density is preferably used for an electric bicycle. Among the above batteries, a film-covered battery, which covered with a film casing material, characterized by high energy efficiency compared with a battery for which a metal can is used as a casing material.

When the electric bicycle is used in rainy conditions, water could get into the battery pack. Further, water condensation or the like could occur inside the battery pack due to temperature change.

Although the battery is covered by a material having high sealing properties, a protective circuit board used in the battery pack is likely to malfunction or deteriorate due to presence of liquid.

There are mounted, on the protective circuit board, comparatively small-sized electronic parts for handling a signal and large-sized electronic parts for controlling main current. Conventionally, to cover all these electronic parts with a moistureproof film, a dam member having a height exceeding a height of tall electronic parts is formed, and then a film forming material is poured inside the dam member. This involves an additional process of forming the dam member and unnecessary use of the film forming material.

There is an electric bicycle whose wheel is mounted on a bearing that is attached to the body of the bicycle via a suspension. However, the impact imposed on the bicycle body is significantly different from that on an automobile. Therefore, a battery pack attached to the body of the bicycle is greatly affected by shocks and vibrations from a road surface, and measures are required to be taken in this regard.

To solve the above problem, according to an aspect of the present invention, there is provided a battery pack including: a battery connecting structure in which a plurality of flat batteries are placed; and a protective circuit board that protects the flat batteries during charging and discharging of the flat batteries, and film formation for the protective circuit board being made using a plurality of film forming materials different in viscosity, hardness, and thixotropic properties.

In the battery pack, film formation for circuit components having a large length from a surface of the board is made using a film formation material having high before curing viscosity.

In the battery pack, film formation for the circuit components having a large length from the board surface is made using a film formation material having high viscosity, high hardness, and high thixotropic properties.

In the battery pack, the battery connecting structure includes a battery protective member having a first plate section and a second plate section which is integrally connected to both edge portions of a width direction of the first plate section and extends substantially in a direction perpendicular to both surfaces of the first plate section, and the flat batteries are placed on the first plate section.

In the present invention, "substantially perpendicular" includes a situation where it is effectively possible to obtain perpendicular and desired operations and effects, for example, including an angle of 80 to 100 degrees.

In the battery pack, a surface on which the flat batteries are placed is formed on both surfaces of the first plate section.

In the battery pack, a flat-plate surface of the flat battery is put on the first plate section.

In the battery pack, the flat batteries are film-covered batteries.

In the battery pack, pull-out tabs of the flat batteries are taken out in the longer direction of the first plate section of the protective member.

In the battery pack, one adhesive side of a two-sided adhesive tape is attached to the flat battery, which then adheres to the first plate section or an adjoining flat battery surface.

According to another aspect of the present invention, there is provided an electric bicycle including the above-described battery pack.

ADVANTAGES OF THE INVENTION

According to the battery pack of the present invention, only application of film forming materials having different physical properties allows components mounted on the protective circuit board to be coated with a moistureproof film, thereby ensuring excellent productivity.

Energy-efficient lithium ion batteries or the like covered with the film casing material can definitely be protected from shocks and the like by the lightweight battery protective member of the present invention, so that even if the battery pack is constantly affected by vibrations and shocks when being used as in a battery pack of an electric bicycle, it is possible to expect that stable operation is maintained for a long time.

BRIEF DESCRIPTION OF THE DRAWINGS

FIG. 1 is a diagram showing a unit battery 100 makes up a battery pack according to an embodiment of the present invention. FIG. 1A is a diagram showing the unit battery 100 whose opening is sealed with heat-sealing sections formed on four sides. FIG. 1B is a diagram showing the unit battery 100 whose opening is sealed with heat-sealing sections formed on three sides.

FIG. 4 is a diagram illustrating a holder member 200 that makes up the battery pack according to the embodiment of the present invention.

DESCRIPTION OF EXEMPLARY EMBODIMENTS

Figure 2:
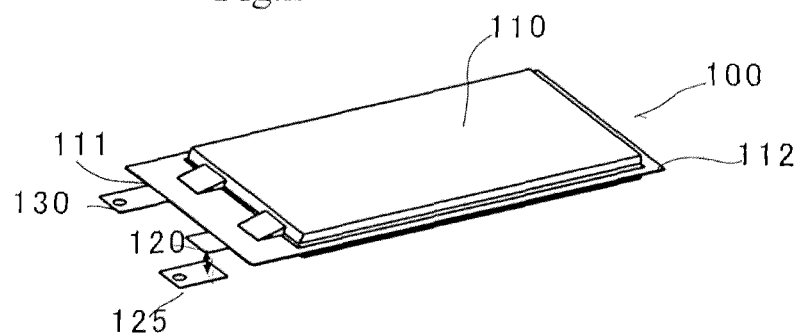
FIG. 2 is a diagram showing how to connect a connection tab 125 to a positive-electrode pull-out tab 120 of the unit battery 100.

The following describes an embodiment of the present invention with reference to the accompanying drawings. FIG. 1 is a diagram showing a unit battery 100 that makes up a battery pack according to an embodiment of the present invention. What is used for the unit battery 100 is a lithium ion secondary battery in which charge and discharge take place as lithium ions move between positive and negative electrodes.

The unit battery 100 of the present invention has a flat shape and therefore is also referred to as a flat battery.

A main unit 110 of the unit battery has a structure in which the following components are stored in a film casing material, which is in the shape of a rectangle in planar view: a laminated electrode assembly, in which a plurality of sheet positive electrodes and a plurality of sheet negative electrodes are stacked via separators, and an electrolytic solution (both not shown). From an upper end portion 111 of the unit battery main unit 110, a positive-electrode pull-out tab 120 and a negative-electrode pull-out tab 130 are pulled out.

The positive-electrode pull-out tab 120 and the negative-electrode pull-out tab 130 are both in the shape of a plate, and are each connected directly, or via a lead body or the like, to the sheet positive electrodes and the sheet negative electrodes in the film casing material. The film casing material includes a heat-sealing resin layer on a plane facing the inside of the battery. Moreover, a film casing material is used for a plane facing the outside of the battery: the film casing material is made by stacking protective films on laminated metallic foil made of aluminum foil or the like.

More specifically, on a plane that is positioned on the outer-surface side of the aluminum foil, a member that has strength and heat resistance, such as nylon or polyethylene terephthalate, is stacked; on the inner-surface side, a material that is excellent in heat-sealing performance, such as polypropylene or polyethylene, is stacked.

With a battery element, in which positive and negative electrodes are stacked via separators, and an electrolytic solution stored in the film casing material, the periphery of the film casing material, i.e. the upper end portion 111, lower end portion 112 and two side end portions 113, is heat-sealed. Therefore, the inside thereof is hermetically sealed.

In the above unit battery 100, aluminum or aluminum alloy is used as a material of the positive-electrode pull-out tab 120; nickel, nickel-plated copper, or nickel-copper clad is generally used as a material of the negative-electrode pull-out tab 130. According to the present embodiment, the positive-electrode pull-out tab 120 made of aluminum and the negative-electrode pull-out tab 130 made of nickel are used.

In order to make the battery pack of the present invention, a positive pull-out tab of a unit battery 100 and a negative pull-out tab of a unit battery 100, which is adjacent to the above unit battery 100, are mechanically bound together with bolts and nuts and therefore connected together electrically. In this case, the structure in which the aluminum positive-electrode pull-out tab 120 of the unit battery 100 and the nickel negative-electrode pull-out tab are mechanically bound together could lead to a decline in conductivity after a predetermined period of time has passed due to problems pertaining to differences in potential. Accordingly, in the battery pack of the present invention, at a point where a positive pull-out tab of a unit battery 100 and a negative pull-out tab, which is adjacent to the above unit battery 100, are mechanically bound together, the pull-out tabs are connected in such a way that the members made of nickel come in contact with each other.

Figure 3:
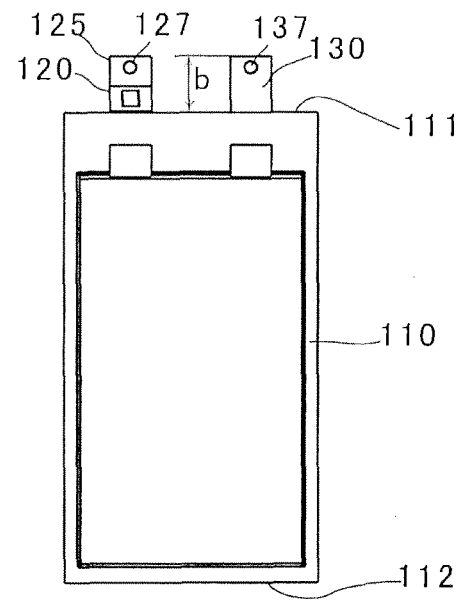
FIG. 3 is a diagram showing the situation where holes are made on a positive pull-out tab and negative pull-out tab for connecting unit batteries 100 in series.

The configuration to achieve the above will be described. As shown in FIG. 1, in a process of making the battery pack, suppose that the aluminum positive-electrode pull-out tab 120 of the unit battery 100 has a length of a from the upper end portion 111, and the nickel negative-electrode pull-out tab 130 a length of b (b>a) from the upper end portion 111. Then, to the aluminum positive-electrode pull-out tab 120 having a length of a, a tab member 125 made of nickel is connected and added by means of ultrasonic waves so that the length from the upper end portion 111 comes to b (see FIGS. 2 and 3). In order to allow unit batteries 100 to be connected in series, a hole 127 is made on the tab member 125, which serves as a positive pull-out tab; a hole 137 is made on the negative-electrode pull-out tab 130. Incidentally, hereinafter, the entire pull-out tab, which is formed by connecting the tab member 125, is also referred to as a positive-electrode pull-out tab 120.

As described below, in the battery pack of the present invention, in a process of electrically connecting a plurality of unit batteries 100, the pull-out tabs having different polarities are connected together in such a way that the nickel members (the tab members 125 and the negative-electrode pull-out tabs 130) come in contact with each other. Accordingly, the electrically connected portions of the adjoining unit batteries turn out to be the portions that are made of the same type of metallic material and are connected electrically. Therefore, the problems pertaining to differences in potential do not arise, and it is substantially possible to prevent a decline over time in conductivity from occurring.

The following describes a holder member 200, which is used in electrically connecting the positive pull-out tabs and negative pull-out tabs of a plurality of unit batteries 100 in the battery pack of the embodiment of the present invention. FIG. 4 is a diagram illustrating the holder member 200. FIG. 4A is a diagram showing the holder member 200 seen from a first main surface side. FIG. 4B is a diagram showing the holder member 200 seen from a second main surface side. FIG. 4C is a cross-sectional view of FIG. 4A taken along X-X'. FIG. 4D is a side view of the holder member 200.

On the holder member 200, a first surface 210 and a second surface 250, which is on the opposite side of the holder member 200 from the first surface 210, are formed; the holder member 200 is a member made of synthetic resin such as ABS resin. In a first row 211 of the first surface 210 of the holder member 200, pull-out tab insertion holes 215 are formed side by side from top to bottom as shown in FIG. 4A. Similarly, in a second row 212 of the first surface 210, pull-out tab insertion holes 215 are formed side by side from top to bottom. When a unit battery 100 is attached to the holder member 200, the pull-out tab insertion holes 215 provided on the first surface 210 are used. The pull-out tab insertion holes 215 are holes passing therethrough from the first surface 210 to the second surface 250; and holes into which the pull-out tabs of the unit battery 100 can be inserted.

As shown in FIG. 4A, on the upper and lower sides of the first and second rows 211 and 212, pull-out tab guide ribs 203 are provided. A pull-out tab guidance section 213 is provided in such a way that the pull-out tab guidance section 213 is sandwiched between the pull-out tab guide ribs 203 of the first row 211. Moreover, a pull-out tab guidance concave section 214 is provided in such a way that the pull-out tab guidance concave section 214 is sandwiched between the pull-out tab guide ribs 203 of the second row 212.

In the first row 211, based on regulations by the pull-out tab guide ribs 203, a pull-out tab of an edge-side unit battery 100, out of a plurality of unit batteries 100 connected in series, is guided to the second surface 250 from the first surface 210 via the pull-out tab guidance section 213.

In the second row 212, based on regulations by the pull-out tab guide ribs 203, a pull-out tab of an edge-side unit battery 100, out of a plurality of unit batteries 100 connected in series, is guided to the second surface 250 from the first surface 210 via the pull-out tab guidance concave section 214.

Among a plurality of unit batteries 100 connected in series, a pull-out tab of a unit batter 100 that is not on the edge side passes through the pull-out tab insertion hole 215 and is attached to the holder member 200. In the upper and lower areas of the pull-out tab insertion hole 215 (as shown in FIG. 4A), pull-out tab guide projecting sections 220 are provided in such a way that the pull-out tab insertion hole 215 is sandwiched between the pull-out tab guide projecting sections 220, which are positioned on the upper and lower sides of the pull-out tab insertion hole 215. The pull-out tab guide projecting sections 220 are generally made up of a top section 221 and two tapered sides 222, which are seamlessly connected to the top section 221. When a pull-out tab of a unit battery 100 is inserted into a pull-out tab insertion hole 215, a space between the two tapered sides 222 becomes gradually narrower, making it easy to attach the unit battery 100 to the holder member 200. Therefore, it is possible to improve efficiency in connecting a plurality of unit batteries 100 in series and increase productivity.

To the second surface 250 of the holder member 200, a board 300 can be attached. On the board 300, the pull-out tabs of the adjacent unit batteries 100 are bent, put on each other and connected, resulting in an electrical connection. When the pull-out tabs of the adjacent unit batteries 100 are connected, the pull-out tabs are mechanically bound together with bolts and nuts. Accordingly, six nut housing sections 255 for housing nuts 256 are provided in the first row 211 of the second surface 250, and five in the second row 212. Moreover, on the second surface 250, divider pieces 260, which are designed to ensure insulation between the pull-out tab connection sections of a unit battery 100 that are formed on the board 300 or between pull-out tab connection sections and pull-out tabs, are provided at three locations in the first row 211 and at two locations in the second row 212.

Positioning projecting sections 263 are projections that help position the board 300 when the board 300 is attached to the holder member 200; one positioning projection section 263 is positioned in the first row 211, and the other in the second row 212. Moreover, one screw hole 270, which is used to bind the board 300 and the holder member 200 together after the board 300 is attached to the holder member 200 with the use of the above positioning projecting sections 263, is provided in the first row 211, and the other in the second row 212.

The following describes the configuration of the board 300 on which connection sections for the pull-out tabs of a plurality of unit batteries 100 are formed in the battery pack of the embodiment of the present invention.

Figure 5:
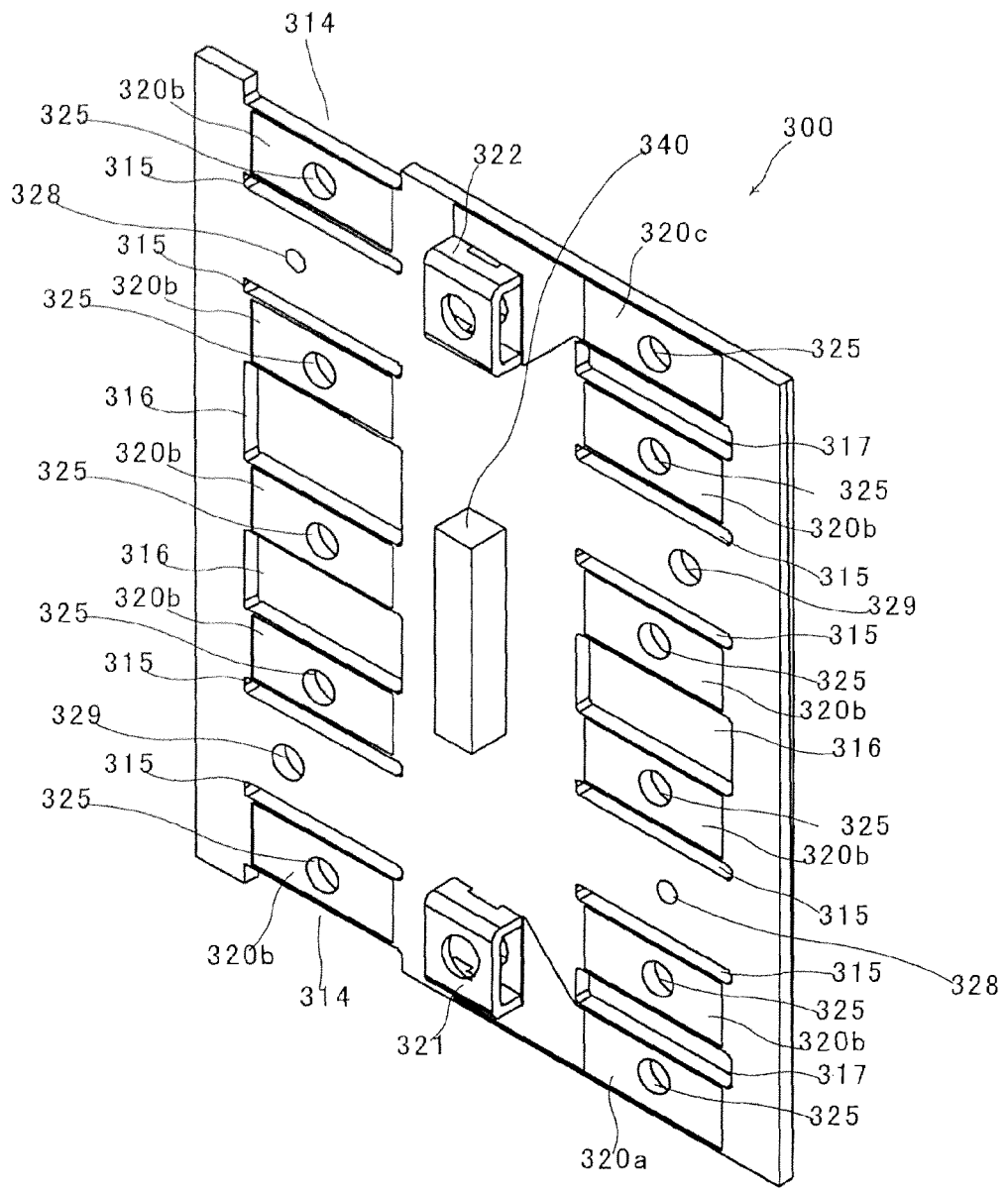
FIG. 5 is a perspective view of a board 300 that is used in connecting unit batteries 100 in series in the battery pack according to the embodiment of the present invention.

FIG. 5 is a perspective view of the board 300 that is used in connecting unit batteries 100 in series in the battery pack of the embodiment of the present invention.

The board 300, which is made by mainly using glass epoxy or the like as base material, is attached to the second surface 250 of the holder member 200 before being used. The peripheral shape of the board 300 substantially matches the peripheral shape of the second surface 250 of the holder member 200. At two locations on the periphery of the board 300, pull-out tab guidance notch sections 314 are formed so as to correspond to the pull-out tab guidance concave sections 214 of the holder member 200.

Moreover, on the board 300, pull-out tab extraction holes 315 are provided so as to correspond to the pull-out tab insertion holes 215 of the holder member 200. Moreover, on the board 300, divider piece extraction holes 317 are provided so as to correspond to the divider pieces 260 of the holder member 200. Furthermore, on the board 300, pull-out tab/divider piece extraction holes 316 are provided to support both the pull-out tab insertion holes 215 and divider pieces 260 of the holder member 200. The above holes are all through-holes that pass through the board 300 from one main surface to the other main surface; and are so formed that the pull-out tabs of unit batteries 100, the divider pieces 260 and the like can be inserted therein.

In areas where the pull-out tabs of unit batteries 100 are fixed to the board 300 with bolts and nuts, the following sections are provided: thin-film electrode sections 320a, 320b and 320c.

There is an electrical connection between a thin-electrode sections 320a and a metallic positive terminal electrode washer 321, which is fixed to the board 300. There is an electrical connection between a thin-film electrode section 320c and a metallic negative terminal electrode washer 322, which is fixed to the board 300. To the positive terminal electrode washer 321 and the negative terminal electrode washer 322, the pull-out tabs of an edge portion of a unit battery 100 that is connected in series are connected. Therefore, the positive terminal electrode washer 321 and the negative terminal electrode washer 322 are used as terminals for charge and discharge of power for the battery pack.

Moreover, there is an electrical connection between a thin-film electrode section 320b and a terminal section, not shown, of a connector 340, allowing the potential for monitoring each unit battery 100 to be measured through the connector 340. Incidentally, the connector 340 may be formed so that a signal from a temperature measurement sensor (not shown) that measures temperatures of unit batteries 100 can be taken out.

For each of the thin-film electrode sections 320a, 320b and 320c, pull-out tab connection screw holes 325 are provided: pull-out tab connection bolts 257, which are used to fix the pull-out tabs of unit batteries 100, are inserted into the pull-out tab connection screw holes 325. To the thin-film electrode section 320a and the thin-film electrode section 320c, one pull-out tab of an edge-portion unit battery 100, out of the unit batteries 100 connected in series, is fixed. Meanwhile, two thin-film electrode sections 320b are fixed in such a way that the pull-out tabs of the adjoining unit batteries 100 are bent and put on each other.

On the board 300, two positioning holes 328 are formed so as to correspond to the positioning projecting sections 263 provided on the second surface 250 of the holder member 200. As the two positioning projecting sections 263 pass through the positioning holes 328, the holder member 200 and the board 300 can be easily positioned when being bound together, contributing to an improvement in productivity. Moreover, board fixing screw holes 329, which are formed on the board 300, are holes into which board fixing screws 271, which are used to fix the holder member 200 to the board 300, are inserted.

The following describes a battery protective member 400, which protects a plurality of unit batteries 100 at a time when the unit batteries 100 are connected in series and turned into a battery connecting structure 500 in the battery pack of the embodiment of the present invention.

Figure 6A:
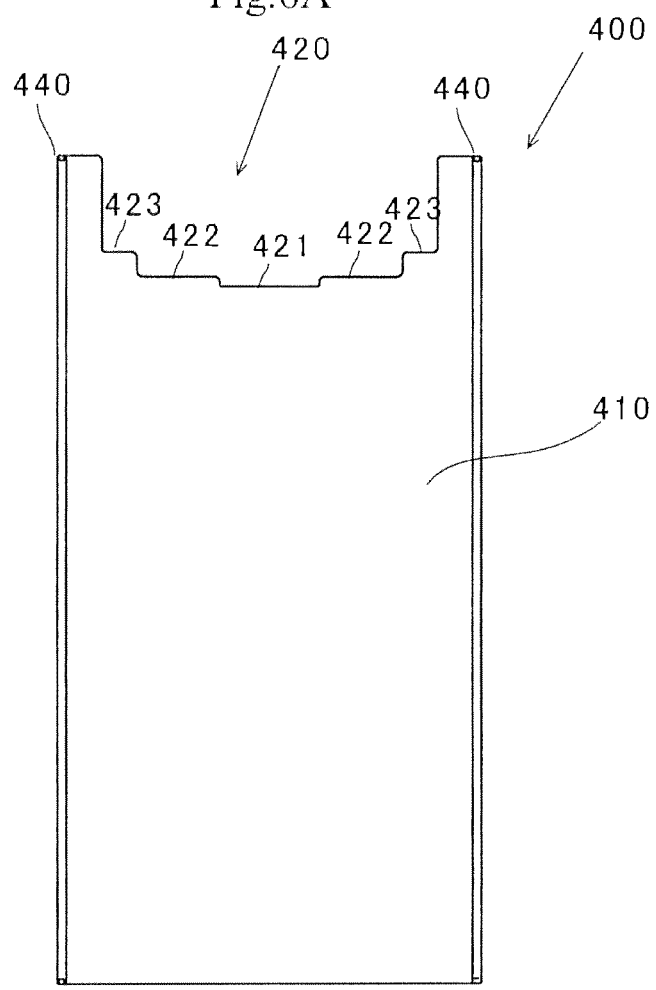
FIG. 6 is a diagram illustrating a battery protective member 400 that makes up the battery pack according to the embodiment of the present invention.
Figure 6B:
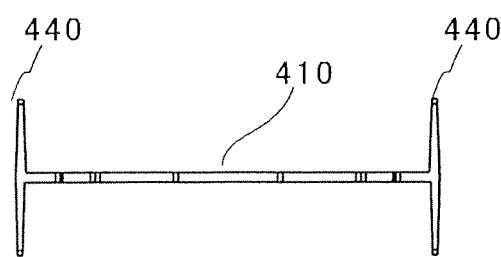

FIG. 6 is a diagram illustrating the battery protective member 400, which makes up the battery pack of the embodiment of the present invention. FIG. 6A is a diagram showing the battery protective member 400 in a way that faces a first plate section 410 to which a main surface of a unit battery 100 is bonded. FIG. 6B is a diagram showing the battery protective member 400 seen an upper end of FIG. 6A.

When unit batteries 100 are placed, the battery protective member 400 of the present invention is inserted between the unit batteries 100 placed before being used.

The battery protective member 400 may be made of synthetic resin, such as ABS resin, polyethylene terephthalate resin or polycarbonate resin. The use of such a material enables a lightweight and inexpensive battery protective member 400 to be realized.

Moreover, the battery protective member 400 may also be made of a metallic member and a member made of synthetic resin with dispersed, highly heat-conductive material particles. The use of such a material enables a highly heat-conductive and lightweight battery protective member 400 to be realized.

More specifically, the metallic member is aluminum, aluminum alloy, or copper. The highly heat-conductive material particles are aluminum nitride, silicon nitride or alumina.

For the synthetic resin material, the following can be listed: ABS resin, polyethylene terephthalate resin, or polycarbonate resin. A material with highly heat-conductive material particles dispersed in the above resin can be listed.

Among the above substances, aluminum or aluminum alloy is suitable.

In the case of aluminum, aluminum alloy or the like, an alumite treatment film or insulating film is preferably formed on the surface. The above film prevents troubles from occurring even when a voltage applying section comes in contact with the protective member.

The first plate section 410 of the battery protective member 400 is a member that is sandwiched between a unit battery 100 and a unit battery 100 that is connected in series to the above unit battery 100. Meanwhile, second plate sections 440 are so provided as to extend in a direction perpendicular to the first plate section 410 from both edge portions of the first plate section 410. Therefore, as shown in FIG. 6B, the cross-sectional surface of the battery protective member 400 is in the shape of "H."

Moreover, a notch section 420, which are made up of the following, is formed on the first plate section 410: a first notch section 421, which is the deepest notch section; second notch sections 422, which are disposed on both sides of the first notch section 421 and are the second deepest notch sections after the first notch section 421; and third notch sections 423, which are disposed on both sides of the second notch sections 422 and are the shallowest notch sections.

The following describes processes of producing, from each of the above members, a battery connecting structure 500 in which unit batteries 100 are connected, with reference to FIGS. 7 to 17. FIGS. 7 to 17 are diagrams illustrating the processes of producing the battery connecting structure 500, which makes up the battery pack of the embodiment of the present invention.

Figure 7:
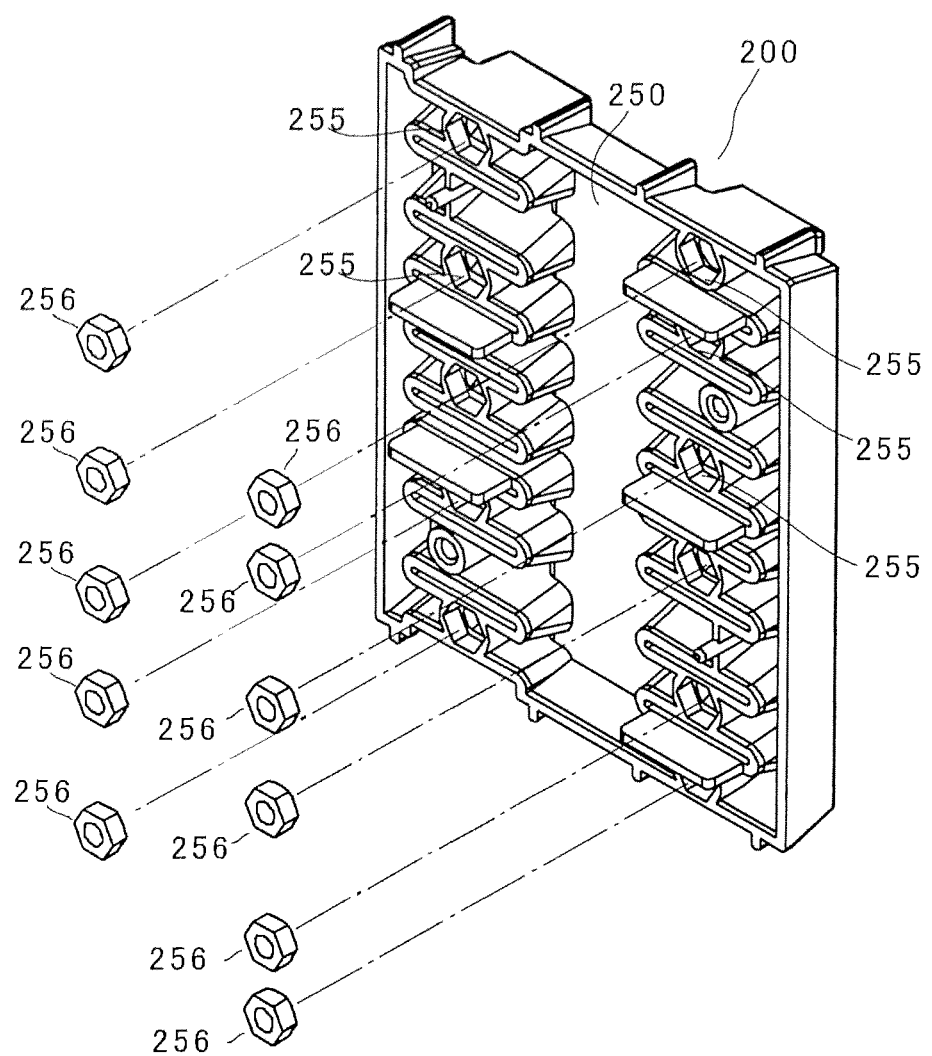
FIG. 7 is a diagram illustrating a process of producing a battery connecting structure 500 that makes up the battery pack according to the embodiment of the present invention.

First, in a process shown in FIG. 7, nuts 256 are mounted in all the nut housing sections 255, which are provided on the second surface 250 of the holder member 200. The dimensions of the inner periphery of the nut housing sections 255 are so set that the nuts 256 cannot be easily removed once the nuts 256 are placed into the nut housing sections 255.

Figure 8:
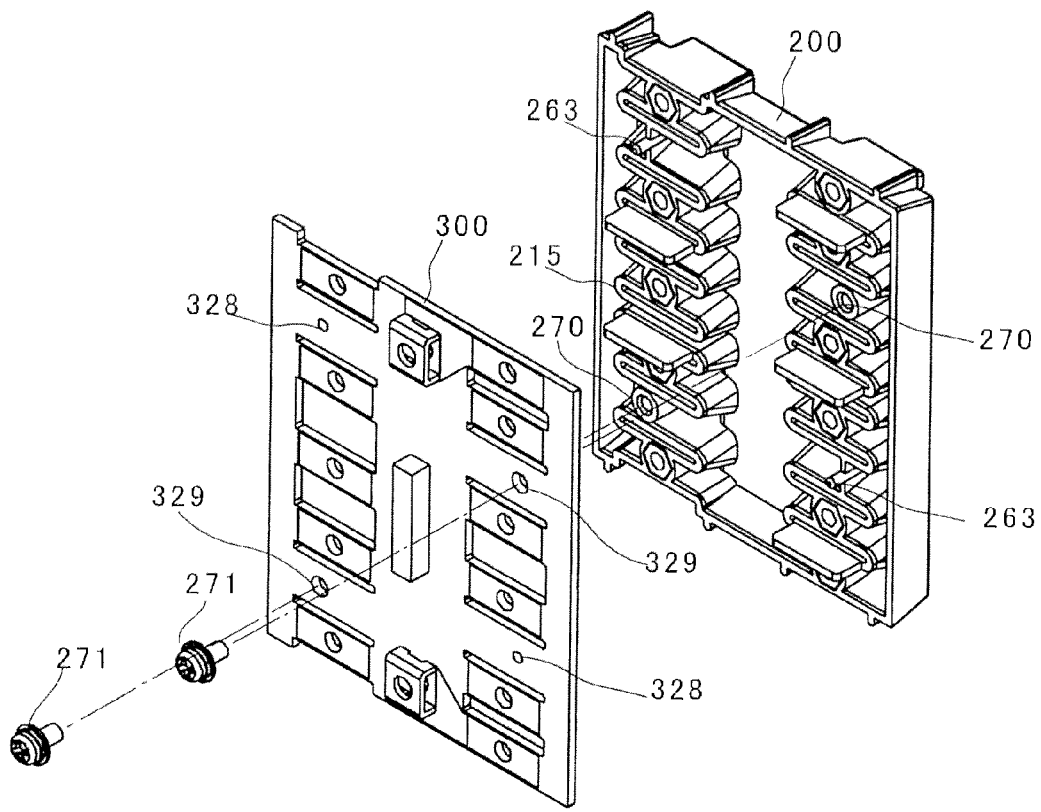
FIG. 8 is a diagram illustrating a process of producing the battery connecting structure 500 that makes up the battery pack according to the embodiment of the present invention.

In a subsequent process shown in FIG. 8, the positioning projecting sections 263 of the holder member 200 are inserted into the positioning holes 328 of the board 300 so that the holder member 200 and the board 300 are positioned. Subsequently, two board fixing screws 271 are inserted into the board fixing screw holes 329 and screwed into screw holes 270. As a result, the holder member 200 is fixed to the board 300. Incidentally, for the board fixing screw holes 329, various kinds of screw can be used. However, the use of self-tapping screws helps improve work efficiency during the production process.

Figure 9:
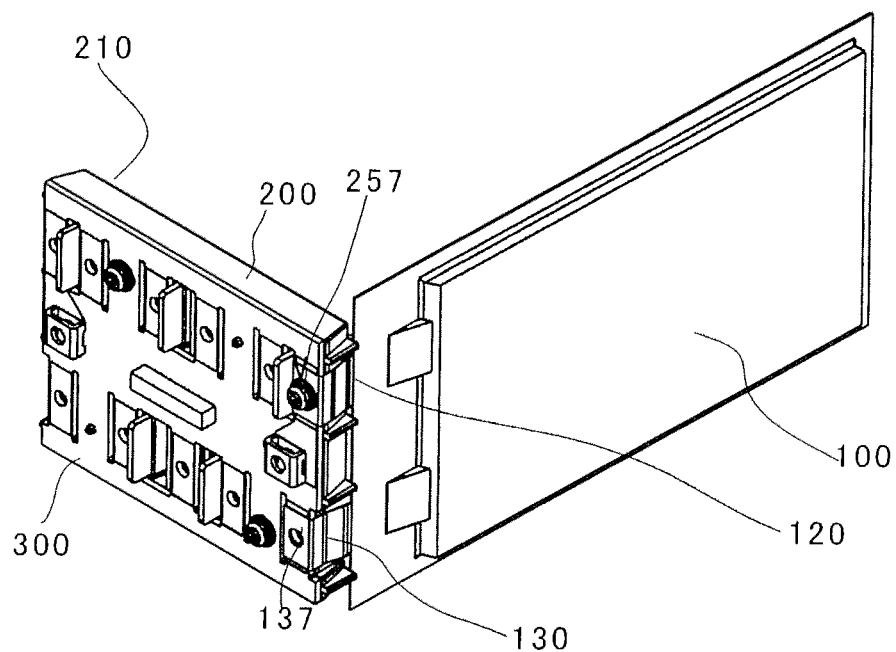
FIG. 9 is a diagram illustrating a process of producing the battery connecting structure 500 that makes up the battery pack according to the embodiment of the present invention.

In a subsequent process shown in FIG. 9, a unit battery 100 is disposed on the first surface 210 of the holder member 200. The negative-electrode pull-out tab 130 of the unit battery 100 is bent so as to come in contact with the thin-film electrode section 320b of the board 300 with the help of the pull-out tab guidance concave section 214. Moreover, the positive-electrode pull-out tab 120 of the unit battery 100 is bent so as to come in contact with the thin-film electrode section 320a of the board 300 with the help of the pull-out tab guidance section 213. The pull-out tab connection bolts 257 are inserted into the holes 127 of the positive-electrode pull-out tab 120 and the pull-out tab connection screw holes 325; the pull-out tab connection bolts 257 are screwed into the nuts 256 housed in the nut housing sections 255. In this manner, the process of mounting the first unit battery 100 is completed.

Figure 10:
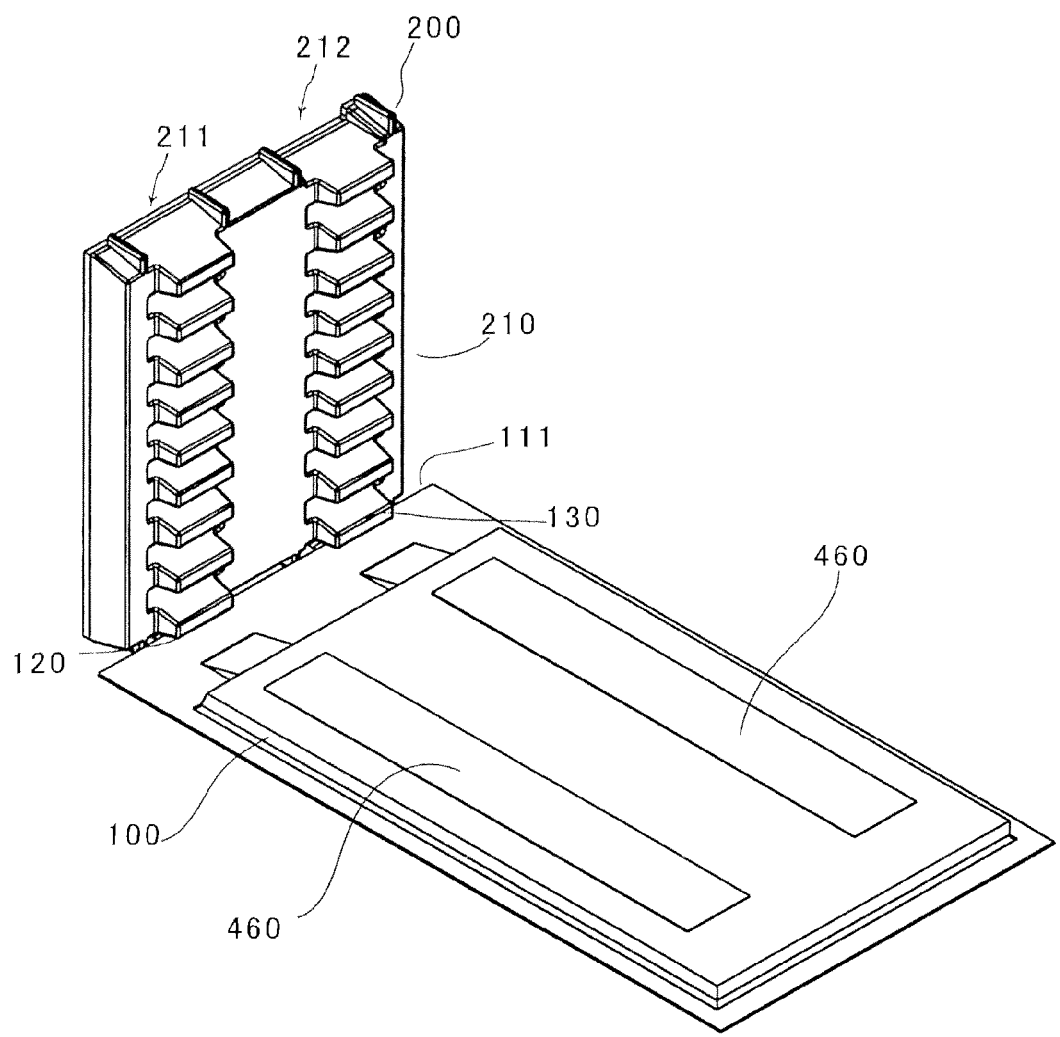
FIG. 10 is a diagram illustrating a process of producing the battery connecting structure 500 that makes up the battery pack according to the embodiment of the present invention.

A subsequent process shown in FIG. 10 takes place on the first surface 210 of the holder member 200. In the process, as shown in the diagram, two strips of two-sided adhesive tape 460 are attached to an upper main surface of the unit battery 100. The two-sided adhesive tapes 460 are used to fix the first unit battery 100, which is attached to the holder member 200, to a second unit battery 100, which is to be attached to the holder member 200. The reason the two strips of two-sided adhesive tape 460 are provided on the main surface of the unit battery 100 as shown in the diagram is to allow a spacer, described later, to be disposed between the two strips of two-sided adhesive tape 460 in order to improve productivity.

Figure 11:
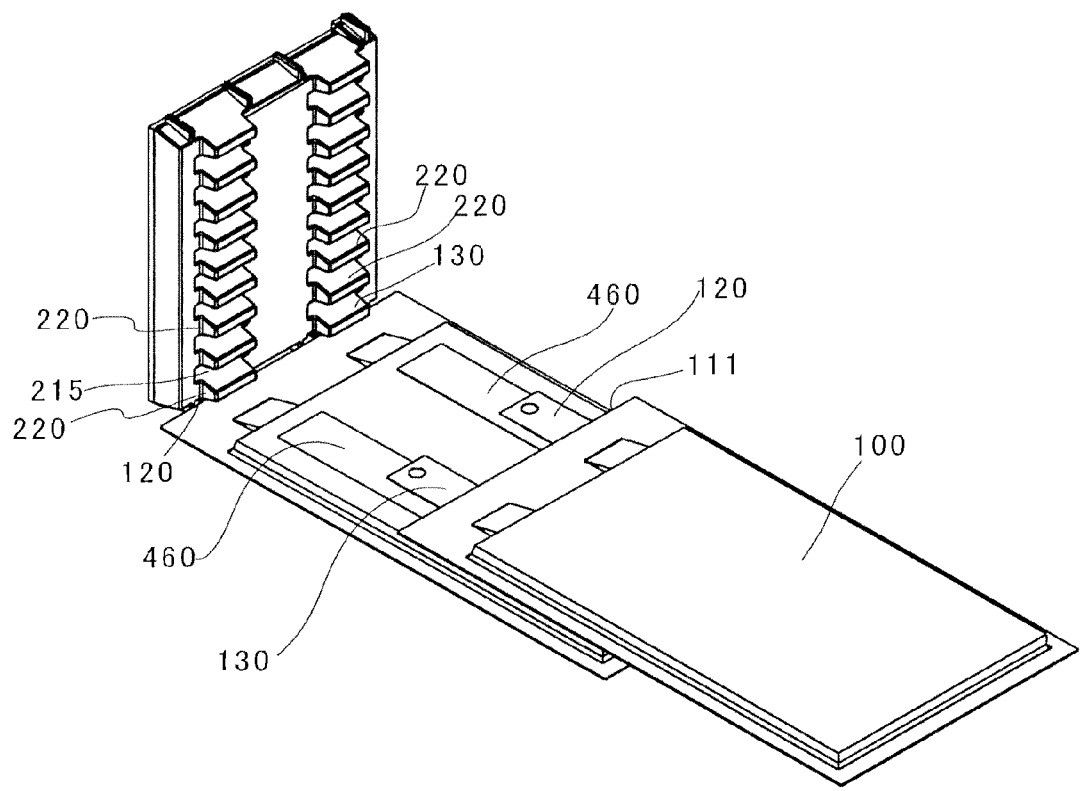
FIG. 11 is a diagram illustrating a process of producing the battery connecting structure 500 that makes up the battery pack according to the embodiment of the present invention.

In a subsequent process shown in FIG. 11, a spacer (not shown) that is thicker than the two-sided adhesive tapes 460 is placed on the first unit battery 100 attached. Furthermore, two pull-out tabs of the second unit battery 100 slide on the spacer and are inserted into the pull-out tab insertion holes 215. As described above, the pull-out tab guide projecting sections 220 are disposed on the upper and lower sides of the two pull-out tab insertion holes 215. Furthermore, the tapered sides 222 are provided on the pull-out tab guide projecting sections 220. Therefore, a space between the upper and lower pull-out tab guide projecting sections 220 becomes gradually narrower, enabling the pull-out tabs of a unit battery to be easily guided to the pull-out tab insertion holes 215 of the holder member 200.

In this case, the positive-electrode pull-out tab 120 of the first unit battery 100 attached to the holder member 200 is disposed in the first row 211, and the negative-electrode pull-out tab 130 in the second row 212. On the other hand, the positive-electrode pull-out tab 120 of the second unit battery 100 attached to the holder member 200 is disposed in the second row 212, and the negative-electrode pull-out tab 130 in the first row 211. Hereinafter, in a process of sequentially placing unit batteries 100, the positive-electrode pull-out tabs 120 of the odd unit batteries 100 attached are disposed in the first row 211, and the negative-electrode pull-out tabs 130 in the second row 212. The positive-electrode pull-out tabs 120 of the even unit batteries 100 attached are disposed in the second row 212, and the negative-electrode pull-out tabs 130 in the first row 211. In this manner, in a direction in which the unit batteries 100 are placed or stacked, the unit batteries 100 are so disposed that the pull-out tabs of the adjacent unit batteries 100 face different directions. Accordingly, on the board 300, connection does not have to take place diagonally with respect to the placing or stacking direction.

After it is confirmed that the upper end portion 111 of the second unit battery 100 is pushed into until the upper end portion 111 hits the first surface 210 of the holder member 200, a subsequent task starts on the board 300.

Figure 12:
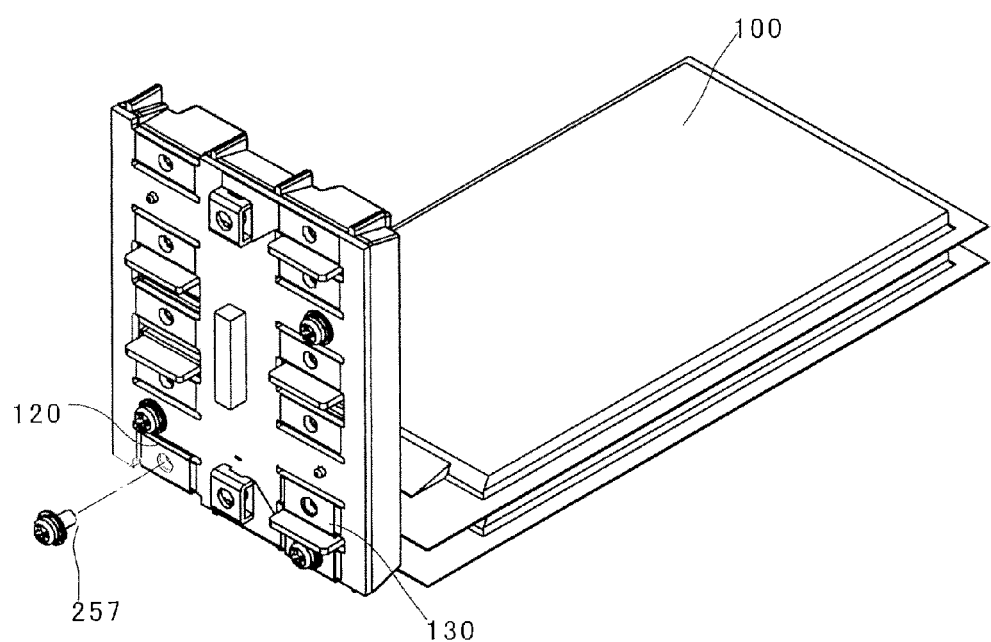
FIG. 12 is a diagram illustrating a process of producing the battery connecting structure 500 that makes up the battery pack according to the embodiment of the present invention.

In a subsequent process shown in FIG. 12, the positive-electrode pull-out tab 120 of the second unit battery 100 attached is bent downward as shown in the diagram, and is put on the negative electrode 130 of the first unit battery 100 attached. After that, a pull-out tab connection bolt 257 is inserted into a hole of each pull-out tab, or pull-out tab connection screw hole 325, and is screwed into a nut 256, forming a connection portion for the negative-electrode pull-out tab 130 of the first unit battery 100 attached on the thin-film electrode section 320b and the positive-electrode pull-out tab 120 of the second unit battery 100 attached. In this manner, an electrical connection is completed.

Meanwhile, the negative-electrode pull-out tab 130 of the second unit battery 100 attached is bent upward as shown in the diagram, thereby making preparations for the positive-electrode pull-out tab 120 of the third unit battery 100 attached to be connected.

Figure 13:
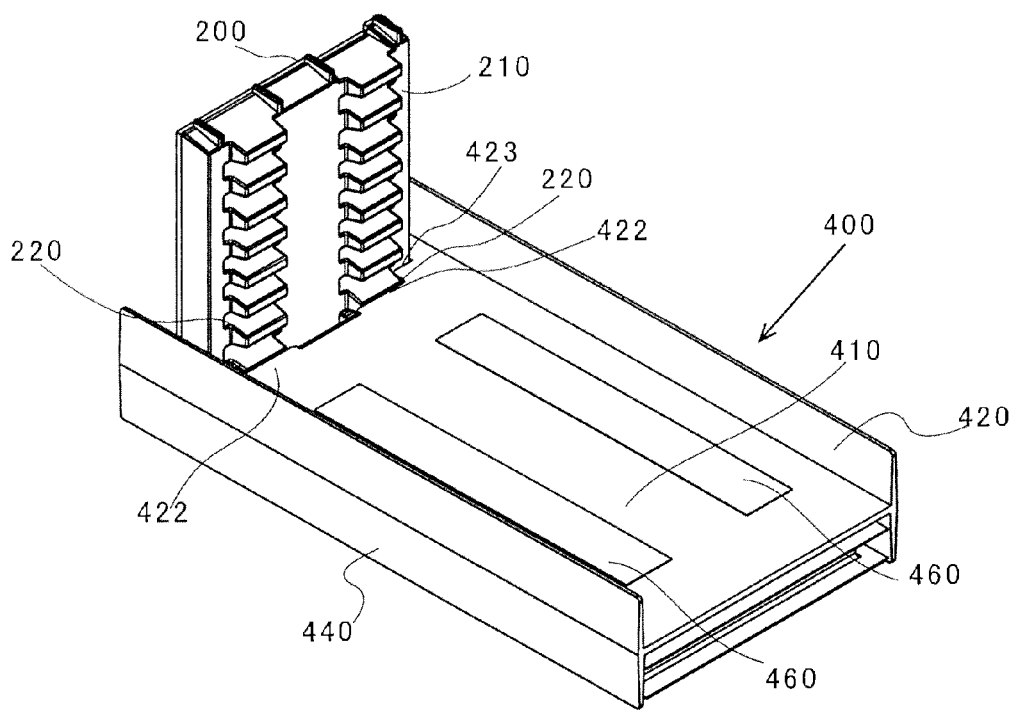
FIG. 13 is a diagram illustrating a process of producing the battery connecting structure 500 that makes up the battery pack according to the embodiment of the present invention.

In a subsequent process shown in FIG. 13, in a similar way to the case where the second unit battery 100 is attached, a battery protective member 400 is attached with the use of a spacer. The upper surface of the second unit battery 100 and the lower surface of the battery protective member 400 are bonded together with two strips of two-sided adhesive tape 460. Furthermore, as shown in the diagram, two strips of two-sided adhesive tape 460 are attached to the upper surface of the battery protective member 400. With the use of the two-sided adhesive tapes 460, the battery protective member 400 is fixed to the third unit battery 100 attached to the holder member 200.

Figure 14:
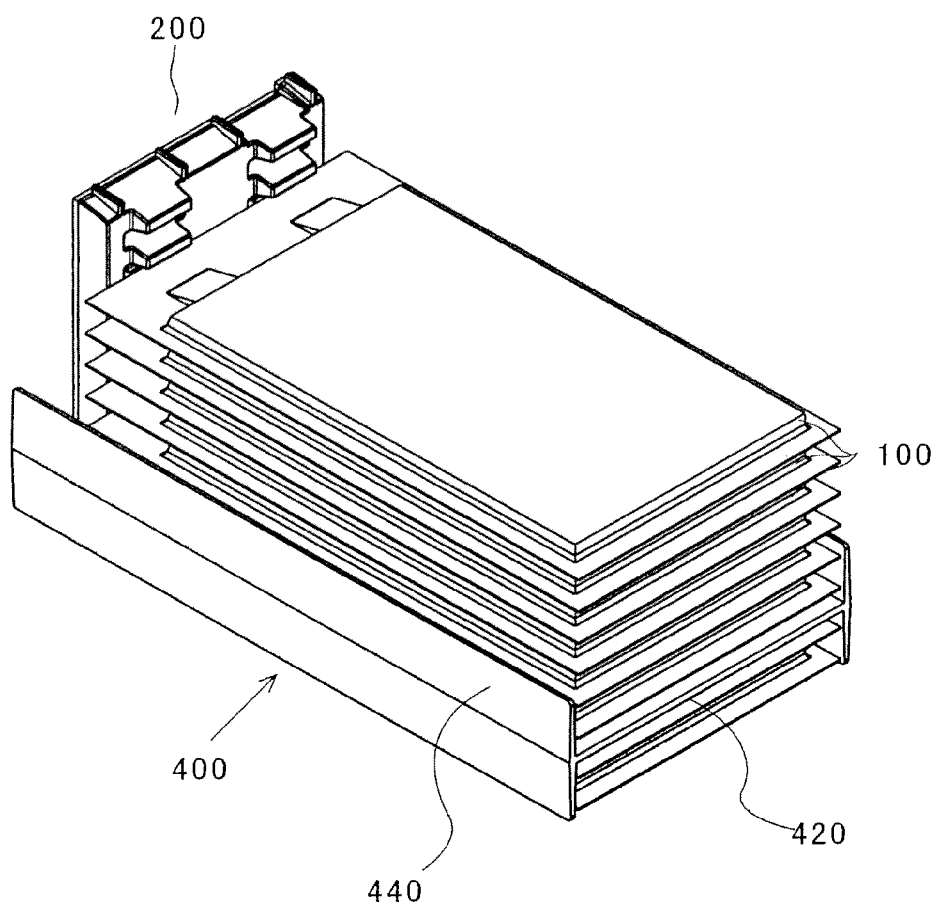
FIG. 14 is a diagram illustrating a process of producing the battery connecting structure 500 that makes up the battery pack according to the embodiment of the present invention.

FIG. 14 shows the situation where the third to eighth unit batteries 100 are sequentially attached to the holder member 200 and the board 300 in a similar way to that described above. On the board 300, each time one unit battery 100 is attached, the pull-out tabs are bent and put on each other, and the pull-out tabs of the adjacent unit batteries 100 are connected by means of the pull-out tab connection bolts 257. In this manner, an electrical connection is realized.

Figure 15:
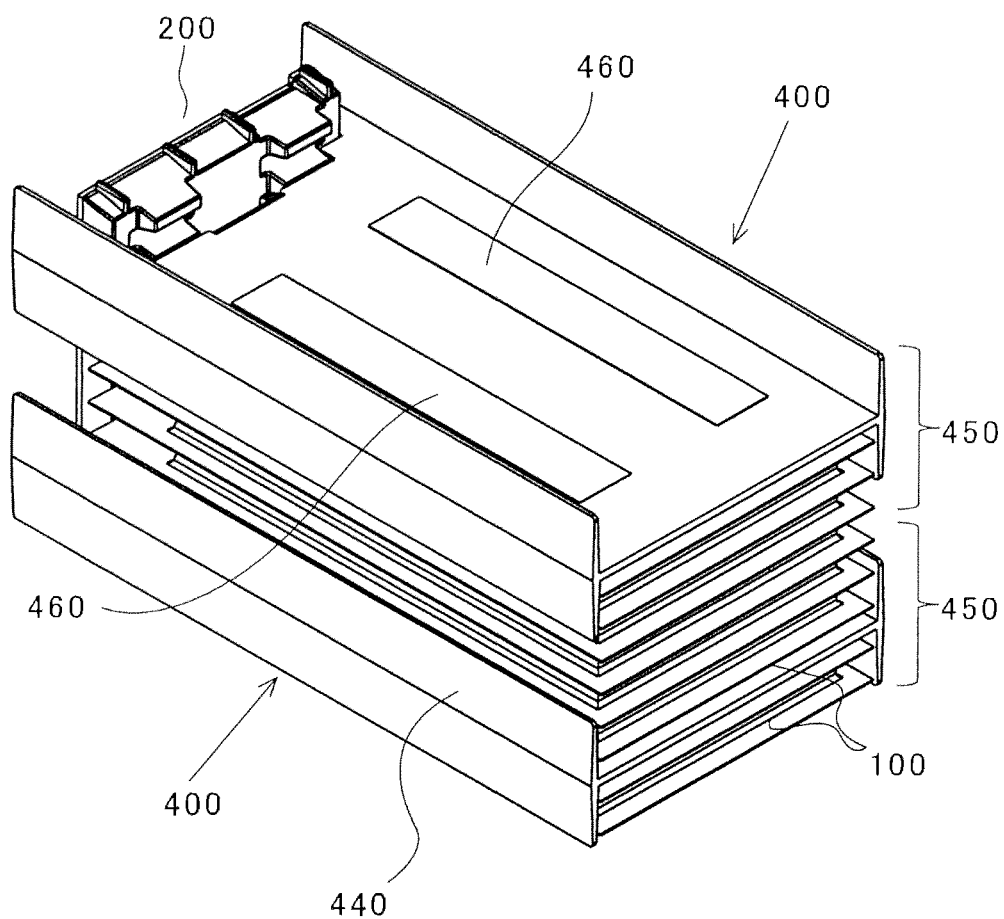
FIG. 15 is a diagram illustrating a process of producing the battery connecting structure 500 that makes up the battery pack according to the embodiment of the present invention.

In a subsequent process shown in FIG. 15, what is shown is the situation where, after the eighth unit battery 100 is attached, still another battery protective member 400 is attached. In this manner, in the battery connecting structure 500 of the present embodiment, two battery protective members 400 are disposed so as to form two battery protective member blocks 450, which are protected by the battery protective members. In this manner, each unit battery 100 is protected against external shocks and the like.

Moreover, the unit batteries 100 are so placed as to rise above an upper end portion of a direction of the height between the first plate section 420 and the second plate section 440. In this manner, since the unit batteries are so placed as to rise above the upper end portion of the second plate section 440, there is an improvement in heat-release performance from the peripheries of the unit batteries.

Batteries that are placed so as to rise above the upper end portion of the above second plate section may be placed on an upper or lower battery protective member 400, or both, in the case of the diagram.

Figure 16A:
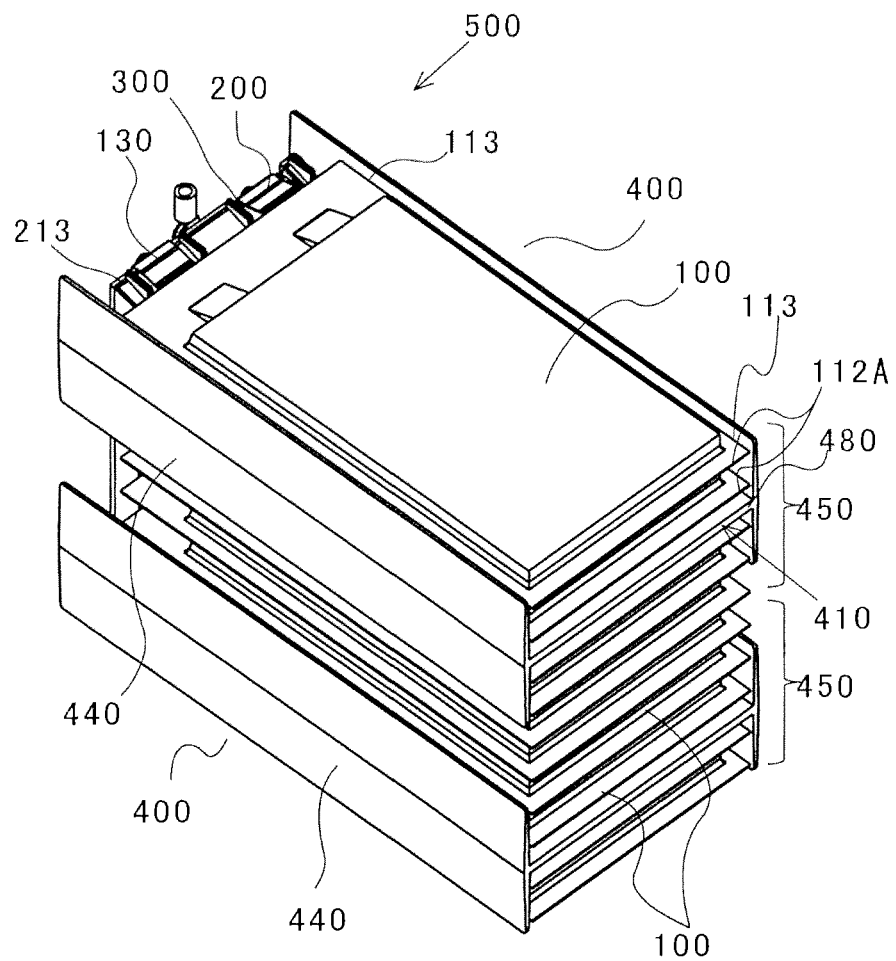
FIG. 16 is a diagram illustrating a process of producing the battery connecting structure 500 that makes up the battery pack according to the embodiment of the present invention.
Figure 16B:
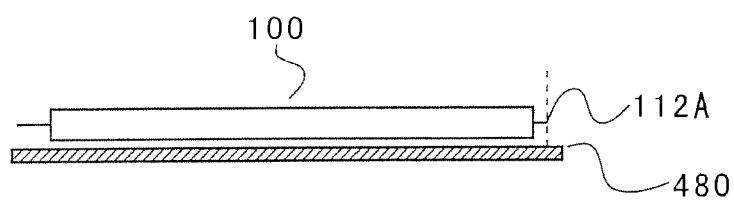

FIG. 16 shows the situation where, on the first plate section 420 of the battery protective member 400, the ninth and tenth unit batteries 100 are further attached to the holder member 200 and the board 300.

The negative-electrode pull-out tab 130 of the tenth unit battery 100 is fixed to a thin-film electrode section (not shown) of the board 300 with the use of the pull-out tab guidance section 213. As a result, the pull-out tabs of the first to tenth unit batteries 100 are each connected on the board 300, and a process of connecting ten unit batteries 100 in series is completed. In this manner, the battery connecting structure 500 including two battery protective member blocks 450 is completed.

Moreover, in the battery connecting structure 500 shown in the diagram, the unit batteries 100 are so placed as to rise above the upper end portion, in the direction of the height from a surface of the first plate section 420, of the second plate section 440 of a side of a battery protective member. The sides of some of the unit batteries are not covered with the second plate section 440 [400→440].

Therefore, the air in the surrounding area flows into the unit batteries 100 from a space between the second plate sections 440 of the upper and lower battery protective members 400, contributing to an improvement in heat-release performance of the unit batteries 100.

A unit battery 100 covered with a film casing material has a heat-sealing section on the periphery. A side edge portion 113 is not bent; the side edge portion 113 is so large in size that the side edge portion 113 comes in contact with an inner surface of the second plate section 440 of the battery protective member 400. Therefore, the unit battery 100 can be precisely positioned on the battery protective member 400 and smoothly placed on the first plate section.

The film casing material is flexible. However, on the heat-sealing section, there is a portion that is higher in rigidity than other portions. Therefore, the heat-sealing section can sufficiently resist a force applied from the side edge portion 113, and therefore can withstand vibrations, shocks and other forces.

Figure 17:
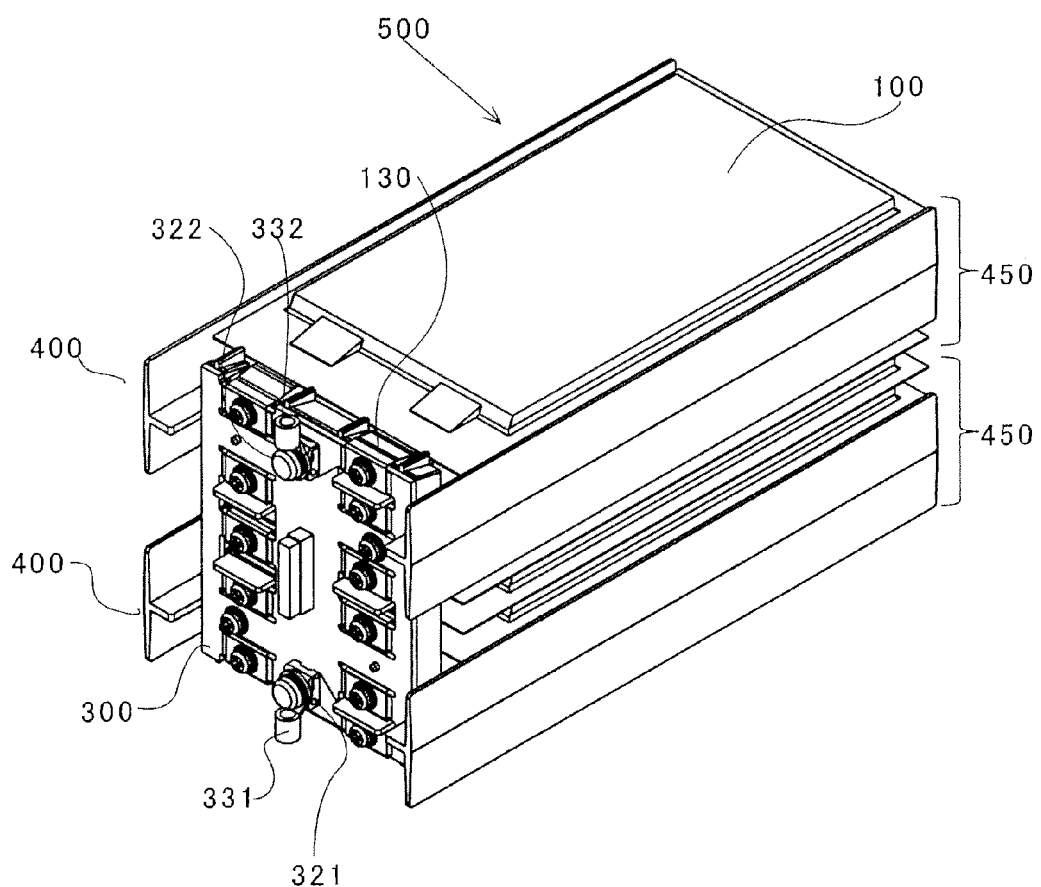
FIG. 17 is a diagram illustrating a process of producing the battery connecting structure 500 that makes up the battery pack according to the embodiment of the present invention.

FIG. 17 is a diagram showing the battery connecting structure shown in FIG. 16 when seen from the board.

The structure includes two battery protective blocks 50. A process of charging and discharging unit batteries 100 connected in series takes place with the use of the positive terminal electrode washer 321 and negative terminal electrode washer 322 attached to the board 300. A terminal member 331 is attached to the positive terminal electrode washer 321, and a terminal member 332 to the negative terminal electrode washer 322.

As described above, the battery pack of the present invention is made in the following manner: the positive and negative pull-out tabs of a plurality of unit batteries 100 are inserted into the pull-out tab insertion holes 215 of the holder member 200, and the pull-out tabs having different polarities of a plurality of the unit batteries 100 are connected together on the board 300. Therefore, the production of battery packs is highly efficient, resulting in an improvement in productivity.

Moreover, the pull-out tabs having different polarities of a plurality of the unit batteries 100 are connected together on the board 300 with pull-out tab connection bolts 257 and nuts 256. Therefore, it is easy to connect a plurality of unit batteries 100 electrically. Thus, the production of battery packs is highly efficient, resulting in an improvement in productivity.

The following describes processes of making a battery pack of the present invention using the battery connecting structure 500, which is formed as described above, with reference to FIGS. 18 to 25.

Figure 18:
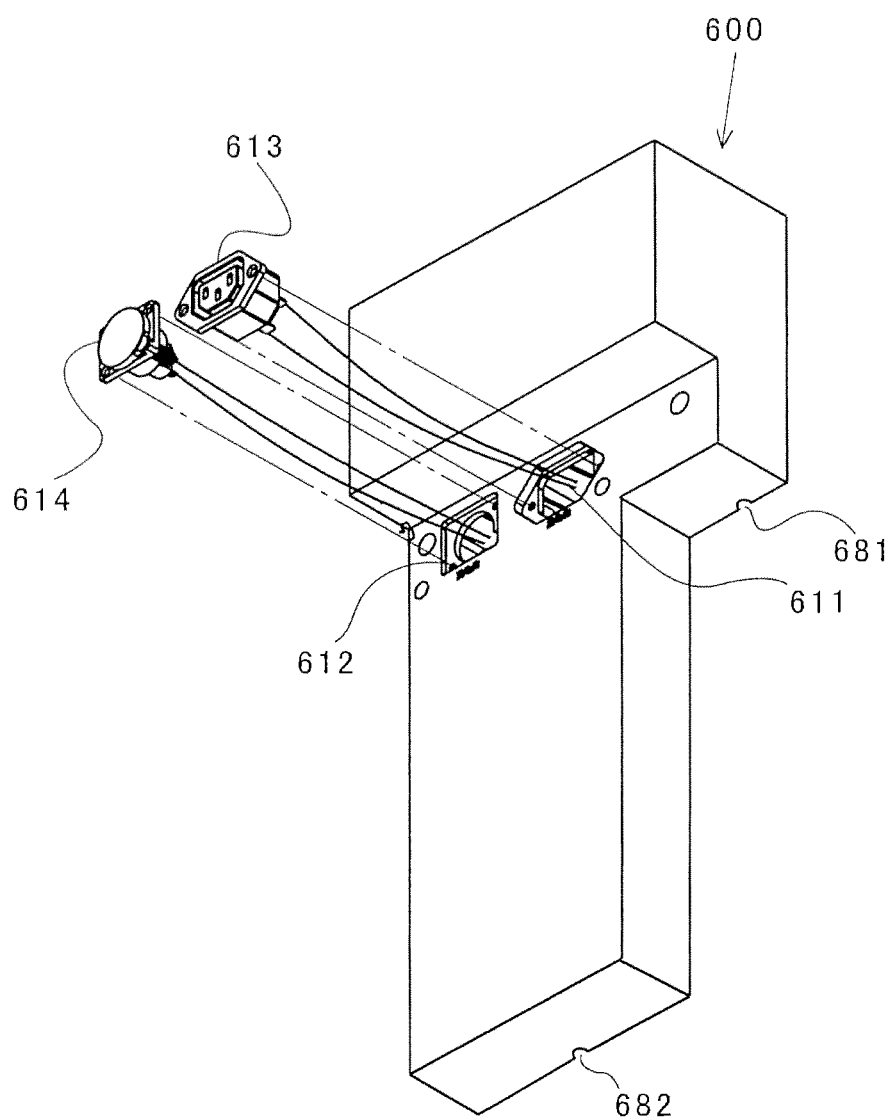
FIG. 18 is a diagram illustrating a process of producing a battery pack according to the embodiment of the present invention.

In a process shown in FIG. 18, to a first case body 600 that houses the battery connecting structure 500, a discharge terminal 613 and a charge terminal 614 are fixed with screws with the help of a discharge terminal attachment concave section 611 and a charge terminal attachment concave section 612, which are provided on the first case body 600.

Figure 19:
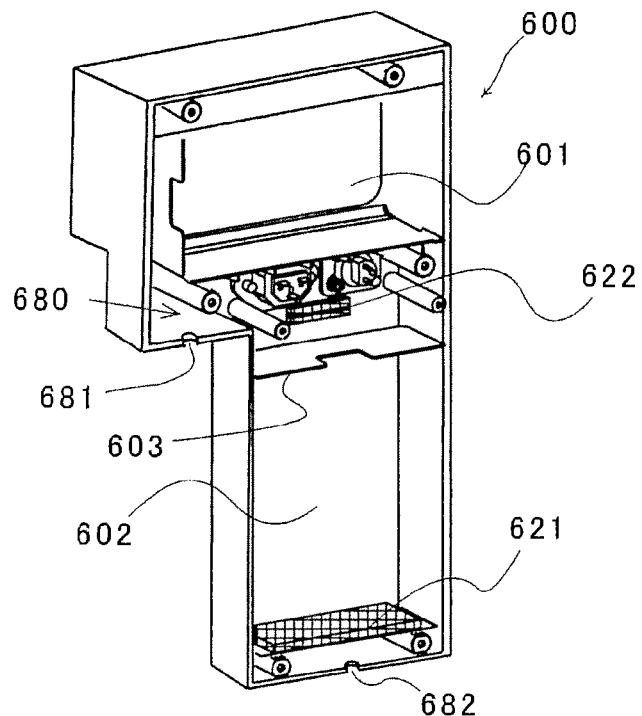
FIG. 19 is a diagram illustrating a process of producing the battery pack according to the embodiment of the present invention.

In a process shown in FIG. 19, a first cushioning member 621 is attached to a second housing section 602 of the first case body 600 with an adhesive or the like, and a second cushioning member 622 to a circuit housing section 603.

In the battery pack of the present invention, as shown in FIGS. 18 and 19, a drain hole 682 is provided on a bottom portion of the battery pack, and a drain hole 681 on an upper compartment section 680.

The battery pack is used outdoors. Therefore, rainwater or the like could get into the battery pack. Water condensation or the like could occur as unit batteries and protective circuit board sections in the battery pack heat up and cool down after the liquid gets in from the outside.

According to the present invention, in addition to the drain hole 682 on the bottom portion, another drain hole is provided on the upper compartment section 680, a compartment in which a protective circuit board, which could be by the liquid, is installed, whereby liquid can be quickly discharged from inside of the battery pack. Therefore, it is possible to prevent an adverse effect associated with the liquid.

Figure 20:
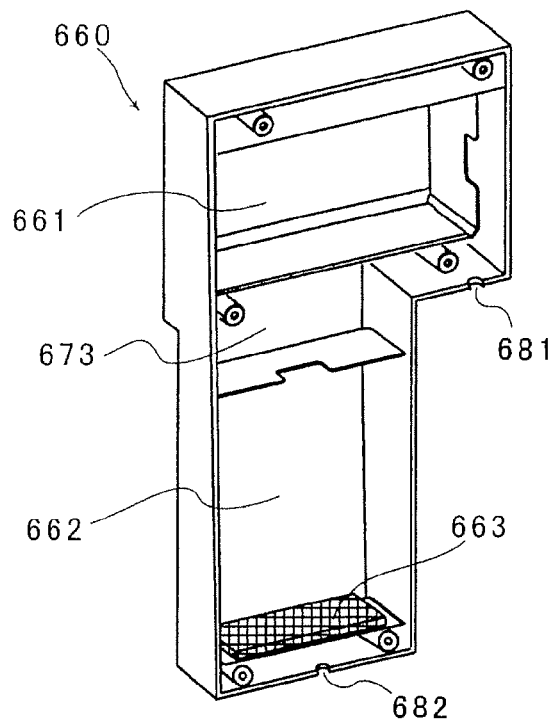
FIG. 20 is a diagram illustrating a process of producing the battery pack according to the embodiment of the present invention.

In a process shown in FIG. 20, to a second housing section 662 of a second case body 660, a third cushioning member 663 is attached with an adhesive or the like.

Figure 21:
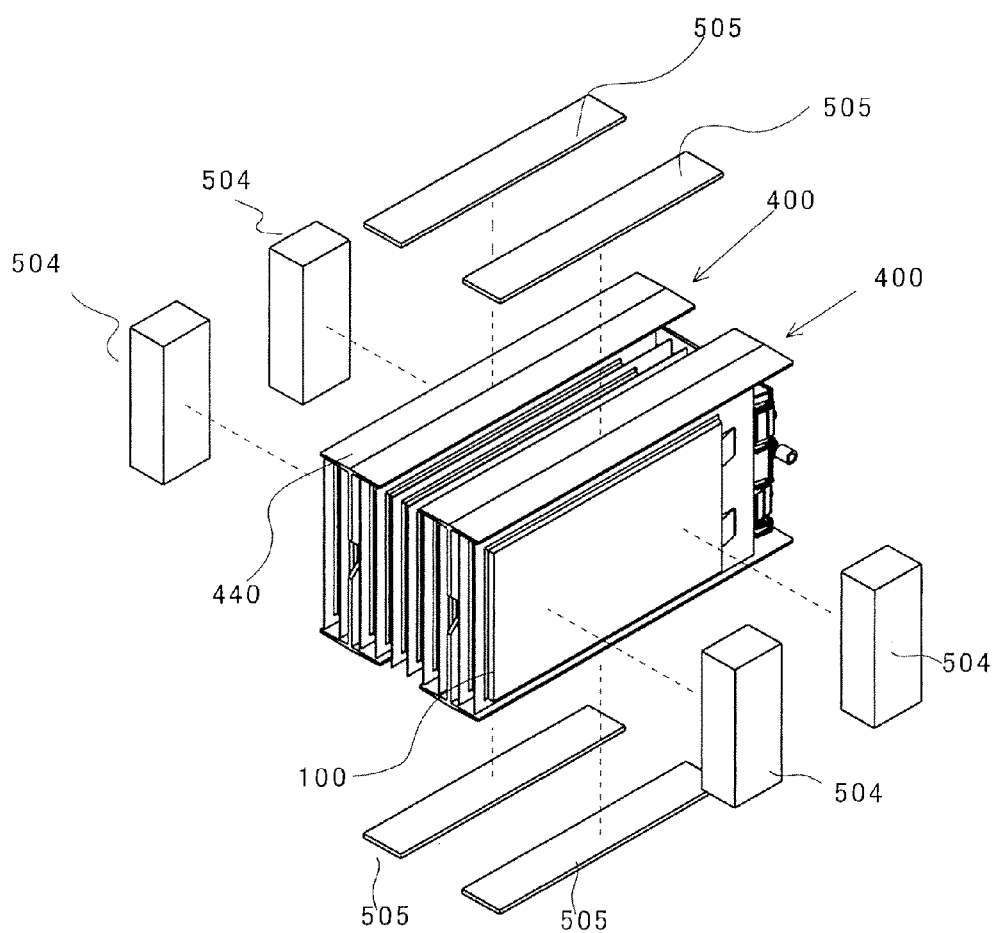
FIG. 21 is a diagram illustrating a process of producing the battery pack according to the embodiment of the present invention.
Figure 22:
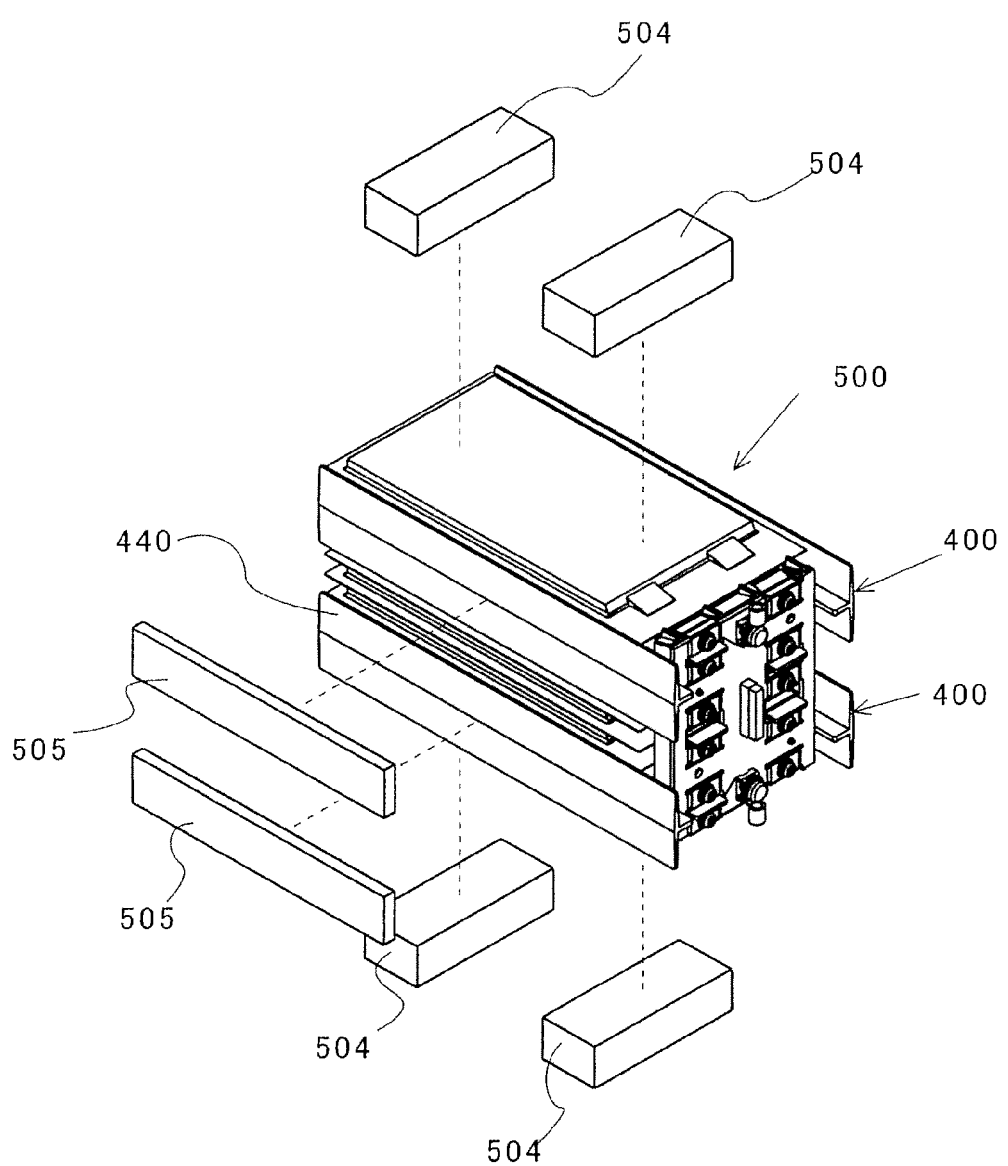
FIG. 22 is a diagram illustrating a process of producing the battery pack according to the embodiment of the present invention.

In processes shown in FIGS. 21 and 22, to the battery connecting structure 500, cushioning materials are attached. In the battery pack of the present invention, two structures, i.e. a first battery connecting structure 500 and a second battery connecting structure 500, are stored in the battery pack.

In a process shown in FIG. 21, as for the first battery connecting structure 500, fourth cushioning members 504, which are thick, are attached to an edge-portion unit battery 100; to the second plate sections of all the battery protective members, fifth cushioning members 505, which are thinner than the fourth cushioning members 504, are attached. An adhesive or the like is used in attaching the fourth cushioning members 504 and the fifth cushioning members 505 to parts.

Meanwhile, in a process shown in FIG. 22, as for the second battery connecting structure 500, fourth cushioning members 504 are attached to an edge-portion unit batter 100; only to the second plate sections of a one-side battery protective member, fifth cushioning members 505 are attached. As in the case described above, an adhesive or the like is used in attaching the fourth cushioning members 504 and the fifth cushioning members 505 to parts.

Figure 23:
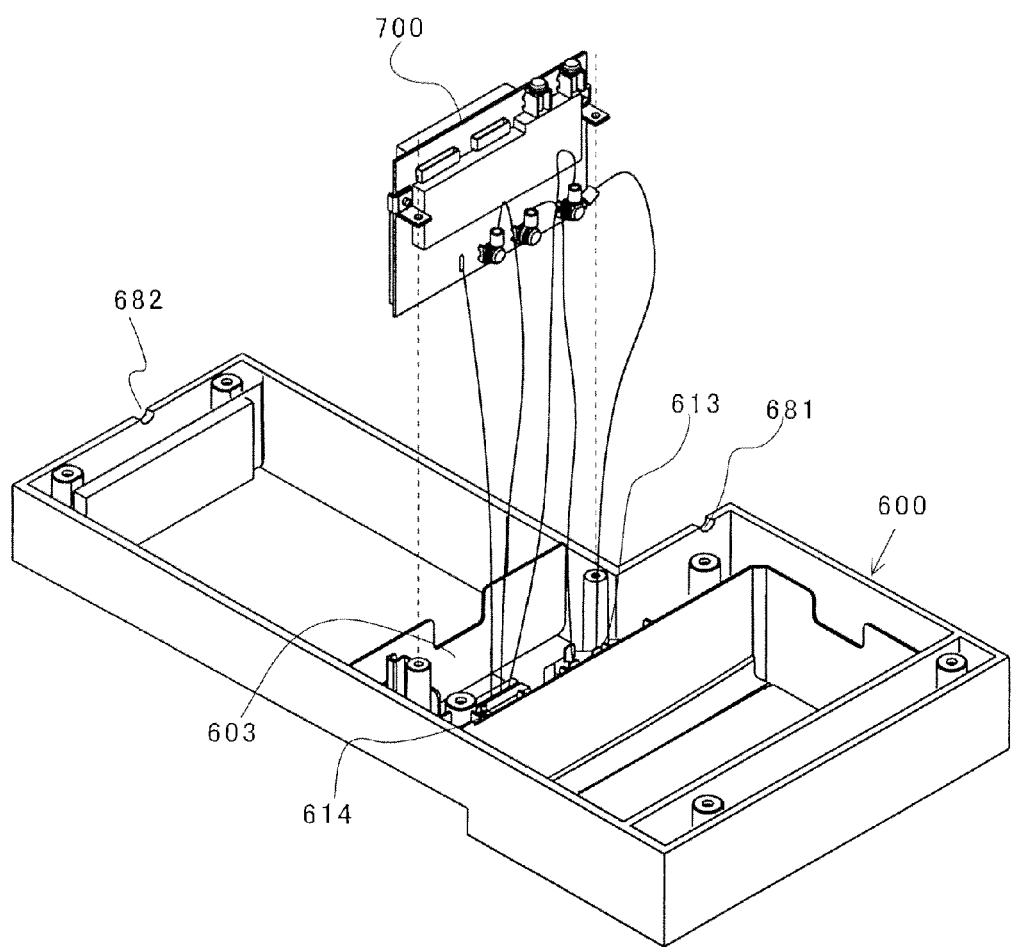
FIG. 23 is a diagram illustrating a process of producing the battery pack according to the embodiment of the present invention.

In a process shown in FIG. 23, a discharge terminal 613, a charge terminal 614 and a protective circuit board 700 are connected with wires. Moreover, the protective circuit board 700 is fixed to the circuit housing section 603 of the first case body 600 with screws.

Figure 24:
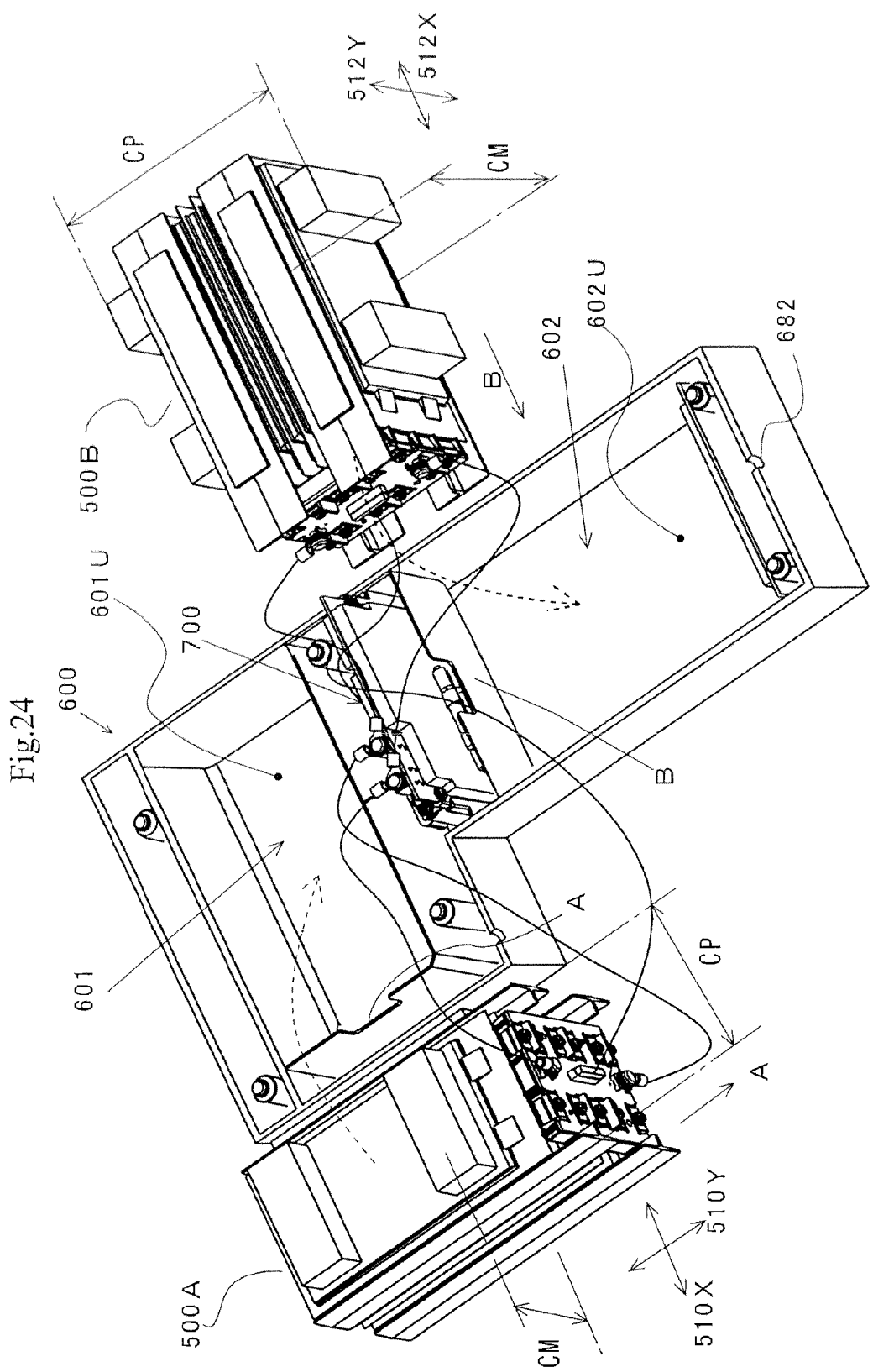
FIG. 24 is a diagram illustrating a process of producing the battery pack according to the embodiment of the present invention.

In a process shown in FIG. 24, the first battery connecting structure 500A is stored in the first housing section 601 of the first case body 600, and the second battery connecting structure 500B in the second housing section 602.

In the protective circuit board 700, for tall circuit components such as FETs, a coating material having high viscosity, high hardness, and high thixotropic properties and thus not running down on a surface of the protective circuit board but forming a film having a predetermined thickness is used.

On the other hand, for short circuit components, a coating material having low viscosity, low hardness, and low thixotropy is used to form a film.

As the coating materials for both tall and short circuit components, a silicone-based adhesive material can be used. The use of the silicone-based material as the coating materials for both tall and short circuit components allows formation of a film having a tight interface between the materials having different physical properties. For example, for the tall circuit components, Cemedine SX720W (viscosity: 45 Pa·s23° C.) consisting primarily of acrylic modified silicone resin can be used; for the short circuit components, SINWE 500 (viscosity: 0.6 Pa·s25° C.) made by Hong Kong Xinwei Chemical Co., Ltd can be used.

In the protective circuit board 700 of the present invention, of all the portions on the circuit board for which coating is necessary, curable resin having high before curing viscosity may be used to coat a portion at which the tall circuit components such as FETs and curable resin having low before curing viscosity may be used to coat the remaining portion. This can reduce unnecessary use of the film forming material positioned at a portion for which the coating is unnecessary. The portion at which the curable resin having high before curing viscosity is used may be set to a portion including the tallest circuit component on the circuit board surface.

The curable resin to be used for the protective circuit board 700 to be used, particularly, in the electric bicycle, is preferably a silicone-based adhesive material that reacts with two types of water having before curing viscosities at room temperature (e.g., about 25° C.) of 20 Pa·s to 90 Pa·s and 0.3 Pa·s to 1.0 Pa·s, respectively to cure. The use of such an adhesive material allows the circuit board to be used in the protective circuit board 700 of the battery pack for electric bicycle to be coated satisfactorily.

The first battery connecting structure 500A, to which cushioning members have been attached, is stored in the first housing section 601 in such a way that a direction CP in which clearance is positive is parallel to the bottom face of the first housing section 601, and a direction CM in which clearance is negative is perpendicular to the bottom face of the first housing section 601.

Furthermore, the second battery connecting structure 500B, to which cushioning members have been attached, is also stored in the second housing section 602 in such a way that a direction CP in which clearance is positive is parallel to the bottom face 601U of the first housing section 601, and a direction CM in which clearance is negative is perpendicular to the bottom face 602U of the second housing section 602.

Incidentally, the positive clearance means that a distance of an outer surface between cushioning members is 1.5 mm to 2 mm smaller than the size of a housing section. The negative clearance means that a distance of an outer surface between cushioning members is 3 mm to 4 mm larger than the size of a housing section.

The first battery connecting structure 500A, to which cushioning members have been attached, and the second battery connecting structure 500B, to which cushioning members have been attached, are each connected to the protective circuit board 700 with lead wires, which are substantially the same in length. Therefore, it is possible to shorten the wires, as well as to make the impedance between the protective circuit board and one battery connecting structure equal to the impedance between the protective circuit board and the other battery connecting structure.

As a result, when the two battery connecting structures are connected in parallel, it is possible to draw energy from batteries in an efficient manner.

Moreover, a surface of the first battery connecting structure to be housed in the first housing section 601, on which the flat batteries are placed is parallel to the bottom face 601U of the first housing section. Meanwhile, a surface of the second battery connecting structure on which the flat batteries are placed is perpendicular to the bottom face 602U of the second housing section. Since the bottom face 601U of the first housing section and bottom face 602U of the second housing section are parallel to each other, the surface of the first battery connecting structure, on which the flat batteries are placed is perpendicular to the surface of the second battery connecting structure, on which the flat batteries are placed.

That is, when the battery pack is mounted on a bicycle, in the second housing section 602 that is positioned in a lower area, a surface of the shortest interval of an portion that is formed by a visible outline of a battery connecting structure and is substantially in the shape of a rectangular parallelepiped, i.e. a surface that is at right angles to a surface of a battery connecting structure on which the flat batteries are placed in the case of the diagram, is placed so as to run parallel to the bottom face of the second housing section 602.

On the bottom face of the first housing section 601, a surface a battery connecting structure, on which the flat batteries are placed is placed so as to be parallel to the bottom face. The surface of the first battery connecting structure, on which the flat batteries are placed and the surface of the second battery connecting structure, on which the flat batteries are placed are disposed so as to cross each other at right angles. In this manner, the battery connecting structures, which are the same in shape and structure, are mounted in the first thick housing section 601 and in the second thin housing section 602.

Figure 25:
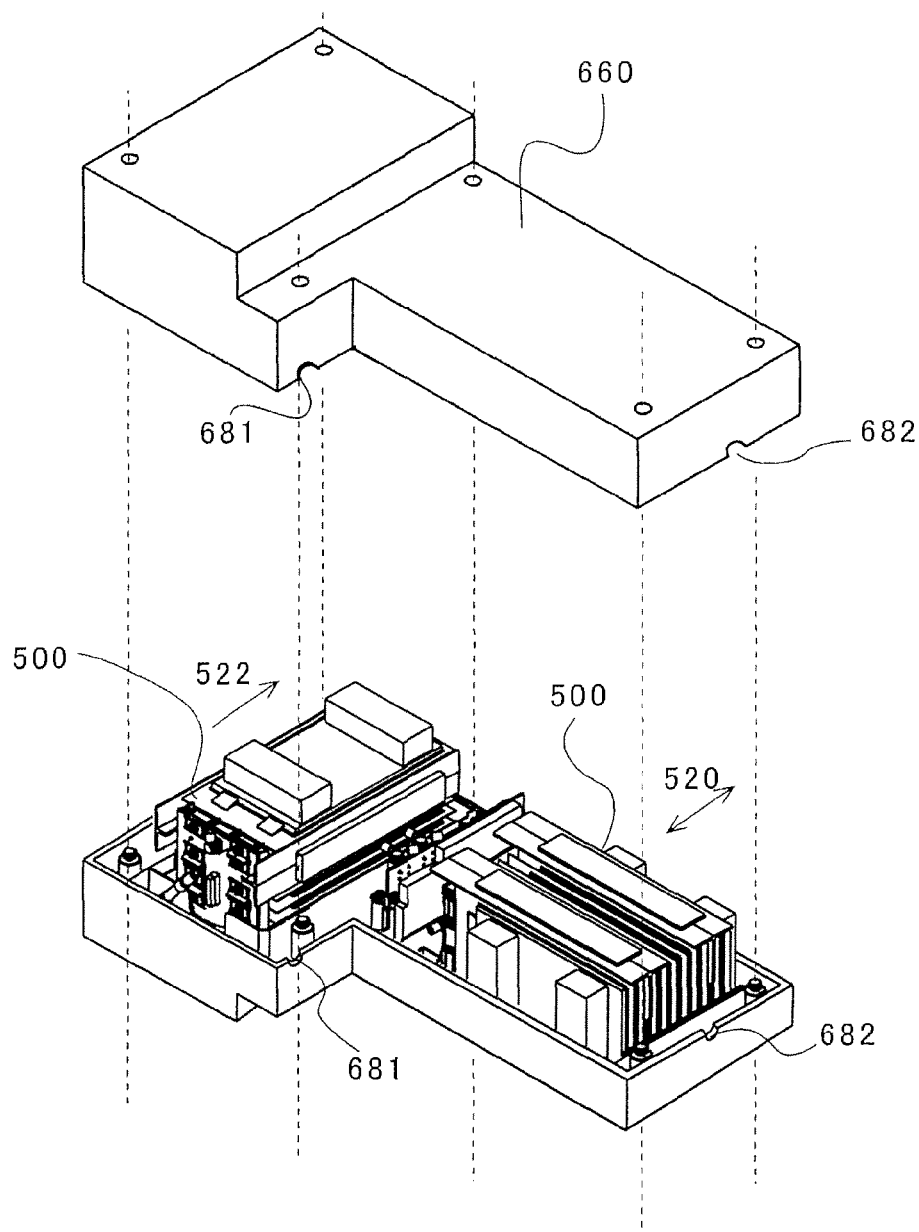
FIG. 25 is a diagram illustrating a process of producing the battery pack according to the embodiment of the present invention.

In a process shown in FIG. 25, the first case body 600 is fixed to the second case body 660 with screws.

In the process, the second case body is placed on the first case body 600. The second case body is fixed to the first case body 600 with screws as the second case body is pushed in a direction in which the clearance of the battery connecting structure to which cushioning members have been attached is negative. As a result, the battery pack of the present invention is completed; in the battery pack, the battery connecting structure does not move even when vibrations or shocks are applied.

Figure 26:
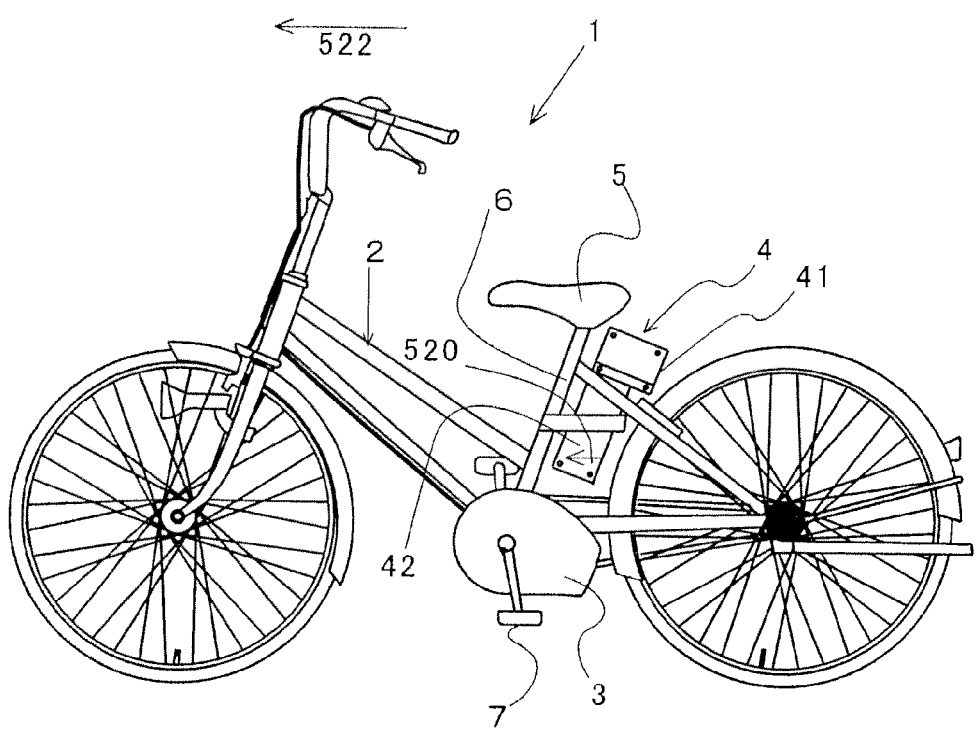
FIG. 26 is a diagram illustrating an electric bicycle according to the embodiment of the present invention.

FIG. 26 is a diagram illustrating an electric bicycle on which the battery pack of the present invention is mounted.

An electric bicycle 1 has a frame 2 on which a battery pack 4 of the present invention is mounted. The battery pack 4 supplies power to a driving mechanism 3 of the electric bicycle.

As described above with reference to FIG. 24, the battery pack 4 includes two housing sections that are different in structure but accommodate the battery connecting structures that are the same in shape. A battery pack upper section 41, which is thick and corresponds to the first housing section 601 shown in FIG. 24, is positioned in a space between a saddle 5 and a rear wheel. Therefore, the battery pack upper section 41 does not come in contact with a leg or the like when a rider rides the bicycle.

Moreover, a battery pack lower section 42, which is thin and corresponds to the second housing section 602 [first→second] shown in FIG. 24, is positioned in a space between a seat post 6 and the rear wheel. However, since the second hosing section, the battery connecting structure 500 is thin even, the second hosing section does not come in contact with a pedal or leg even when a rider rotates the pedal 7.

The battery pack 4 of the present invention is mounted directly on the frame 2 that is subject to vibrations and shocks from a road surface. In the battery pack 4, measures have been taken against vibrations and shocks. Therefore, the battery pack 4 operates in a stable manner.

INDUSTRIAL APPLICABILITY

According to the battery pack of the present invention, energy-efficient lithium ion batteries or the like covered with the film casing material are definitely protected from shocks and the like by the light weight battery protective member. Moreover, a plurality of coating materials having different physical properties are applied to the protective circuit board inside the battery pack depending on the height of the circuit component, so that it is possible to form a reliable protective film on both the tall circuit components and short circuit components, thereby providing a battery pack provided with a high-reliable protective circuit board not adversely affected by liquid.

EXPLANATION OF SYMBOLS

1: Electric bicycle
2: Frame
3: Driving mechanism
4: Battery pack
41: Battery pack upper section
42: Battery pack lower section
5: Saddle
6: Seat post
7: Pedal
100: Unit battery
110: Unit battery main unit
111: Upper end portion
112: Lower end portion
120: Positive-electrode pull-out tab
125: Tab member
127: Hole
130: Negative-electrode pull-out tab
137: Hole
200: Holder member
203: Pull-out tab guide rib
210: First surface
211: First row
212: Second row
213: Pull-out tab guidance section
214: Pull-out tab guidance concave section
215: Pull-out tab insertion hole
220: Pull-out tab guide projecting section
221: Top section
222: Tapered side
250: Second surface
255: Nut housing section
256: Nut
257: Pull-out tab connection bolt
260: Divider piece
263: Positioning projecting section
270: Screw hole
271: Board fixing screw
300: Board
314: Pull-out tab guidance notch section
315: Pull-out tab extraction hole
316: Pull-out tab/divider piece extraction hole
317: Divider piece extraction hole
320a, 320b, 320c: Thin-film electrode section
321: Metallic positive terminal electrode washer
322: Metallic negative terminal electrode washer
325: Pull-out tab connection screw hole
328: Positioning hole
329: Board fixing screw hole
331, 332: Terminal member
340: Connector
400: Battery protective member
410: First plate section
420: Notch section
421: First notch section
422: Second notch section
423: Third notch section
440: Second plate section
450: Battery protective member block
460: Two-sided adhesive tape
500: Battery connecting structure
504: Fourth cushioning member (thick)
505: Fifth cushioning member (thin)
600: First case body
601: First housing section
601U: Bottom face
602: Second housing section
602U: Bottom face
603: Circuit housing section
611: Discharge terminal attachment concave section
612: Charge terminal attachment concave section
613: Discharge terminal
614: Charge terminal
621: First cushioning member
622: Second cushioning member
660: Second case body
661: First housing section
662: Second housing section
663: Third cushioning section
673: Circuit housing section
680: Upper compartment section
681, 682: Drain hole
700: Protective circuit board

What is claimed is:

1. A battery pack comprising: a battery connecting structure on which a plurality of flat batteries are placed; and a protective circuit board that protects the flat batteries during charging and discharging of the flat batteries, a film formation for the protective circuit board being made using a plurality of film forming materials different in viscosity, hardness, and thixotropic properties, wherein circuit components implemented on the protective circuit board include: a circuit component having a highest height from the board and having a surface covered only with a first hardening resin, and a circuit component having a surface covered only with a second hardening resin whose viscosity, hardness, and thixotropic properties are lower than those of the first hardening resin.

2. The battery pack according claim 1, wherein
the battery connecting structure includes a battery protective member having a first plate section and a second plate section which is integrally connected to both edge portions of a width direction of the first plate section and extends substantially in a direction perpendicular to both surfaces of the first plate section, wherein
the flat batteries are placed on the first plate section.

3. The battery pack according to claim 2, wherein
a surface on which the flat batteries are placed is formed on both surfaces of the first plate section.

4. The battery pack according to claim 3, wherein
a flat-plate surface of the flat battery is put on the first plate section.

5. The battery pack according to claim 1, wherein
the flat batteries are film-covered batteries.

6. An electric bicycle comprising the battery pack as claimed in claim 1.

* * * * *